(12) United States Patent
Yamada

(10) Patent No.: US 10,197,894 B2
(45) Date of Patent: Feb. 5, 2019

(54) DUSTPROOF MEMBER FOR IMAGE GENERATION DEVICE AND IMAGE PROJECTION APPARATUS

(71) Applicant: Masamichi Yamada, Kanagawa (JP)

(72) Inventor: Masamichi Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/824,104

(22) Filed: Nov. 28, 2017

(65) Prior Publication Data

US 2018/0157156 A1 Jun. 7, 2018

(30) Foreign Application Priority Data

Dec. 2, 2016 (JP) .................. 2016-235113

(51) Int. Cl.
G03B 21/14 (2006.01)
G03B 21/20 (2006.01)
G03B 21/42 (2006.01)

(52) U.S. Cl.
CPC ....... G03B 21/142 (2013.01); G03B 21/2066 (2013.01); G03B 21/42 (2013.01)

(58) Field of Classification Search
CPC ... G03B 21/142; G03B 21/2066; G03B 21/42
See application file for complete search history.

(56) References Cited

U.S. PATENT DOCUMENTS 5,883,742 A 3/1999 Kamata
6,416,184 B1 * 7/2002 Arai ............... G03B 21/16
349/5
2005/0050569 A1 3/2005 Yamanaka et al.
2005/0193576 A1 9/2005 Hollman et al.
2006/0227514 A1 * 10/2006 Kang ............... H04N 5/7458
361/719
2006/0284495 A1 12/2006 Seo
2010/0033820 A1 2/2010 Omi
(Continued)

FOREIGN PATENT DOCUMENTS

JP 2001-350196 12/2001
JP 2006-203776 8/2006
(Continued)

OTHER PUBLICATIONS

U.S. Appl. No. 15/592,237, filed May 11, 2017 Masamichi Yamada, et al.

*Primary Examiner* — Sultan Chowdhury
*Assistant Examiner* — Magda Cruz
(74) *Attorney, Agent, or Firm* — Harness, Dickey & Pierce, P.L.C.

(57) ABSTRACT

An image generation device includes an image generator, a stationary unit, a movable unit, and a dustproof unit. The image generator receives light and generate an image. The stationary unit includes a first stationary plate and a second stationary plate opposed to the first stationary plate. The movable unit includes a movable plate movably supported between the first stationary plate and the second stationary plate, the image generator mounted on the movable plate. The dustproof unit includes a dustproof member between the first stationary plate and the movable plate. The dustproof member surrounds the image generator.

6 Claims, 17 Drawing Sheets

(56) References Cited

U.S. PATENT DOCUMENTS

| | | |
|---|---|---|
| 2011/0019157 A1 | 1/2011 | He |
| 2014/0036239 A1 | 2/2014 | Mashitani |
| 2015/0219983 A1 | 8/2015 | Mashitani et al. |
| 2015/0264291 A1 | 9/2015 | Tani et al. |
| 2016/0154294 A1 | 6/2016 | Fujioka et al. |
| 2016/0198134 A1 | 7/2016 | Mikawa et al. |
| 2016/0277716 A1 | 9/2016 | Mikawa et al. |
| 2017/0017092 A1 | 1/2017 | Mikawa |
| 2017/0187996 A1 | 6/2017 | Yokoyama et al. |
| 2017/0244940 A1 | 8/2017 | Mikawa et al. |
| 2017/0272710 A1 | 9/2017 | Mikawa |
| 2017/0272711 A1 | 9/2017 | Mikawa |
| 2017/0272718 A1 | 9/2017 | Mikawa et al. |

FOREIGN PATENT DOCUMENTS

| | | |
|---|---|---|
| JP | 2008-070494 | 3/2008 |
| JP | 2008-225158 | 9/2008 |
| JP | 2008-292647 | 12/2008 |
| JP | 2010-243686 | 10/2010 |
| JP | 2011-027821 | 2/2011 |
| JP | 2012-181386 | 9/2012 |
| JP | 2013-117629 | 6/2013 |
| JP | 2016-035506 | 3/2016 |
| JP | 2016-085363 | 5/2016 |
| JP | 2016-102945 | 6/2016 |
| JP | 2016-102946 | 6/2016 |
| JP | 2017-167286 | 9/2017 |
| WO | WO2016/067519 | 5/2016 |

\* cited by examiner

FIG. 9
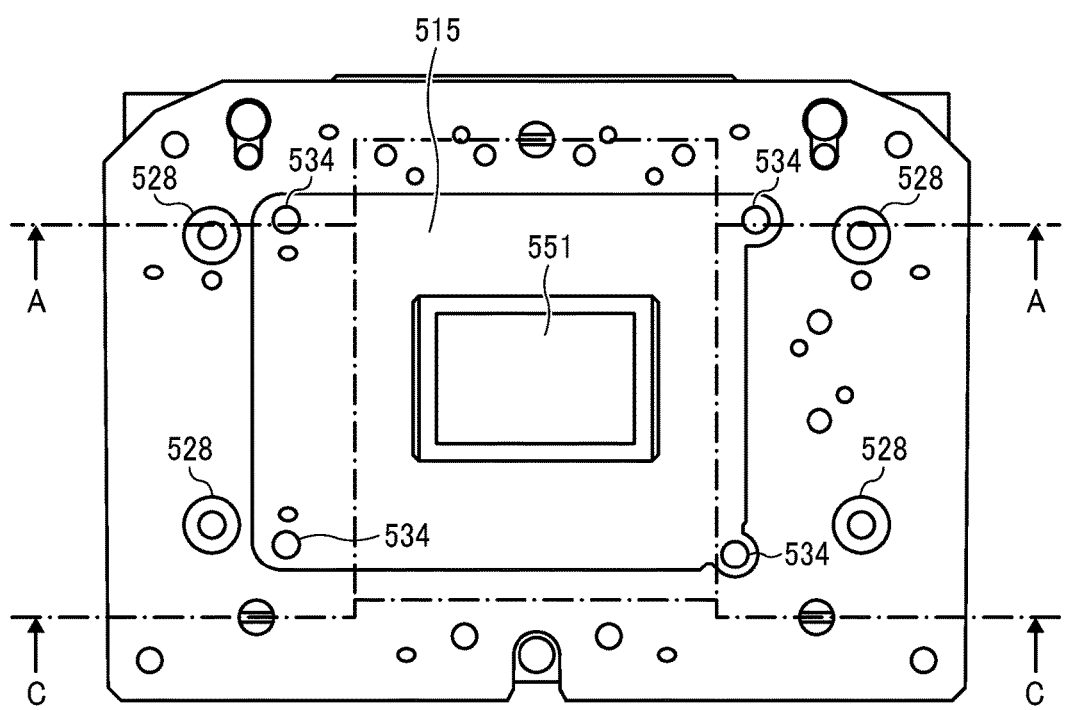
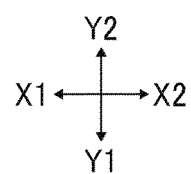

FIG. 10
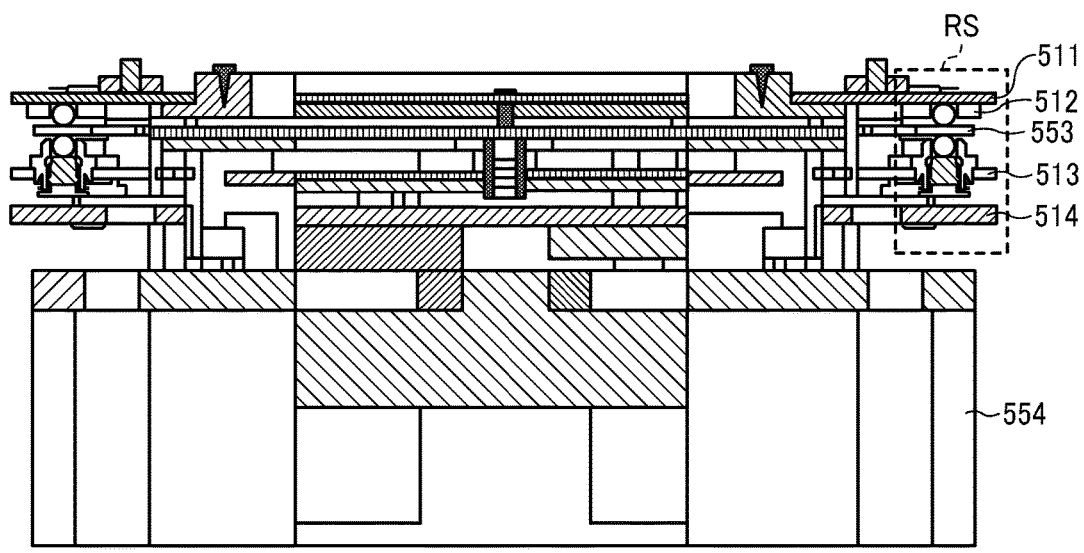
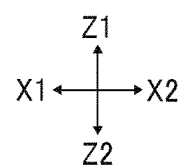

DUSTPROOF MEMBER FOR IMAGE GENERATION DEVICE AND IMAGE PROJECTION APPARATUS

CROSS-REFERENCE TO RELATED APPLICATION

This patent application is based on and claims priority pursuant to 35 U.S.C. § 119(a) to Japanese Patent Application No. 2016-235113, filed on Dec. 2, 2016, in the Japan Patent Office, the entire disclosure of which is hereby incorporated by reference herein.

BACKGROUND

Technical Field

Aspects of the present disclosure relate to an image generation device and an image projection apparatus.

Related Art

For example, there is known an image projection apparatus in which a display element generates a projection image based on input image data, and the generated projection image is magnified and projected on a screen or the like.

For example, an image projection apparatus is proposed that performs pixel shift by shifting the optical axis with a pixel shifter with respect to light beams emitted from a plurality of pixels of a display element, to project an image having a higher resolution than the resolution of the display element.

For such an image projection apparatus, for example, a method of maintaining image quality by reducing adhesion of dust to a display element has been studied. For example, a dustproof mechanism is proposed that includes a protective glass to prevent adhesion of dust to a display element and a movable member to form an air flow around the protective glass to move the dust away from the protective glass. In the dustproof mechanism, dust and other substance are attached to the protective glass located on the outer side of an image conversion element to prevent dust and other substance from adhering to the image conversion element.

SUMMARY

In an aspect of the present disclosure, there is provided an image generation device that includes an image generator, a stationary unit, a movable unit, and a dustproof unit. The image generator receives light and generate an image. The stationary unit includes a first stationary plate and a second stationary plate opposed to the first stationary plate. The movable unit includes a movable plate movably supported between the first stationary plate and the second stationary plate, the image generator mounted on the movable plate. The dustproof unit includes a dustproof member between the first stationary plate and the movable plate. The dustproof member surrounds the image generator.

In another aspect of the present disclosure, there is provided an image projection apparatus that includes a light source, the image generation device, an illumination optical unit, and a projection optical unit. The image generation device receives light from the light source and generate an image. The illumination optical unit guides the light from the light source to the image generation device. The projection optical unit projects the image generated by the image generation device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 9 is a plan view of the image generation unit viewed from a top plate side;

FIG. 10 is a cross-sectional view of the image generation unit cut along line A-A in FIG. 9;

Figure 1:
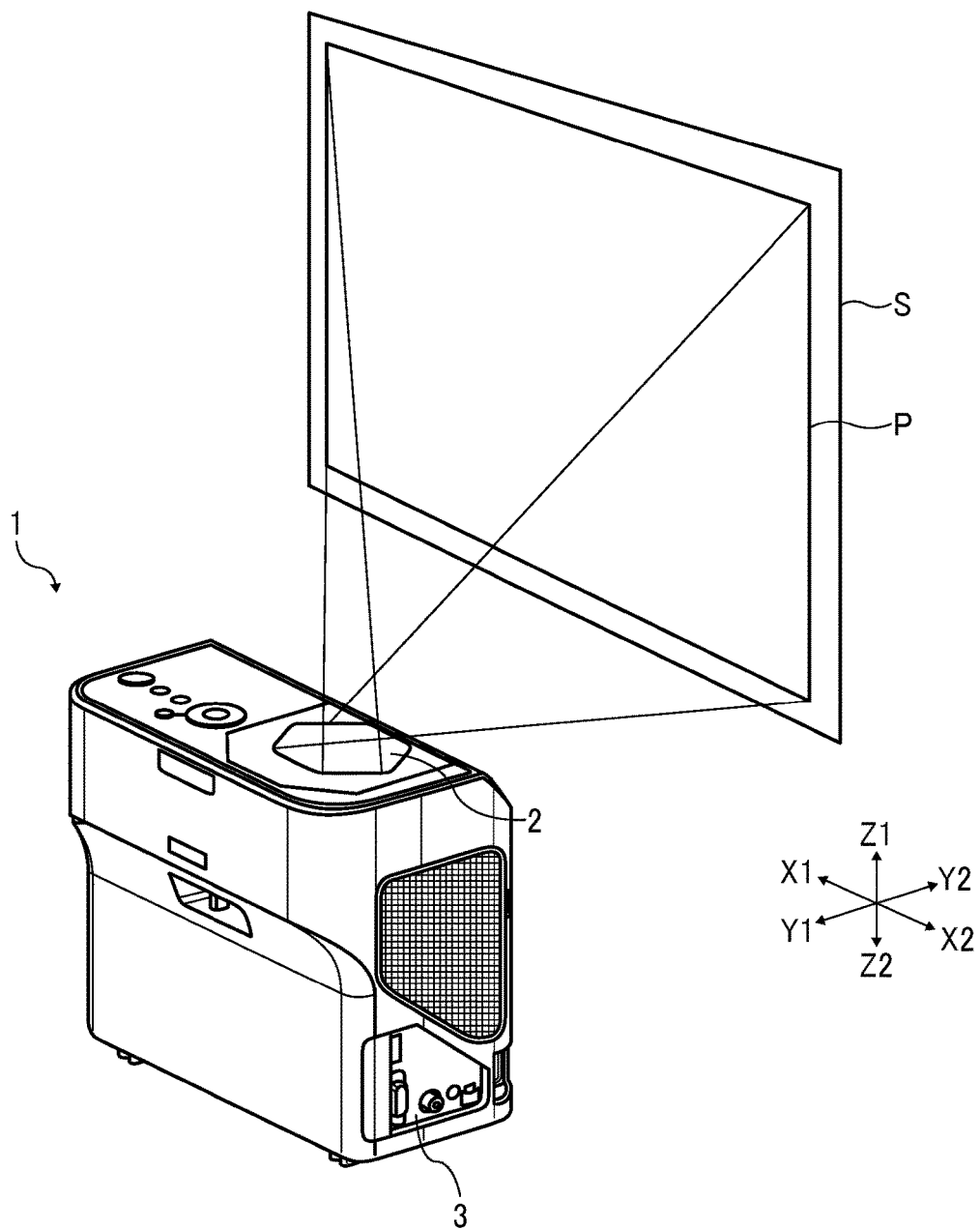
FIG. 1 is a diagram of an example of an image projection apparatus according to an embodiment of the present disclosure.

The accompanying drawings are intended to depict embodiments of the present disclosure and should not be interpreted to limit the scope thereof The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Hereinafter, embodiments of the present disclosure are described with reference to attached drawings. Note that embodiments are not limited to the embodiments described below, but can be appropriately modified without departing from the gist of the present invention. In the following description, a side (top-plate side) of an image projection apparatus closer to a top plate is referred to as "upper" or "above", and a side (heat-sink side) of the image projection apparatus closer to a heat sink may be referred to as "lower" or "below".

<Image Projection Apparatus>

An image projection apparatus according to an embodiment of the present disclosure is described below. In the present embodiment, a case in which the image projection apparatus is a projector is described.

FIG. 1 is an illustration of an example of the image projection apparatus according to an embodiment of the present disclosure. As illustrated in FIG. 1, a projector 1 as the image projection apparatus according to the present embodiment includes an exit window 2, an external interface (external I/F) 3, and an optical engine to generate a projection image. For example, when image data is transmitted from a personal computer or a digital camera connected to the external I/F 3, the projector 1 generates a projection image based on the image data transmitted by the optical engine and projects an image P from the exit window 2 onto a screen S.

In the following drawings, the term "X1-X2 direction" represents the width direction of the projector 1, the term "Y1-Y2 direction" represents the depth direction of the projector 1, and the terms "Z1-Z2 direction" represents the height direction of the projector 1. In the following description, in the Z1-Z2 direction, a side (exit-window side) of the projector 1 closer to the exit window 2 may be referred as "upper" and the opposite side of the exit-window side may be referred to as "lower".

Figure 2:
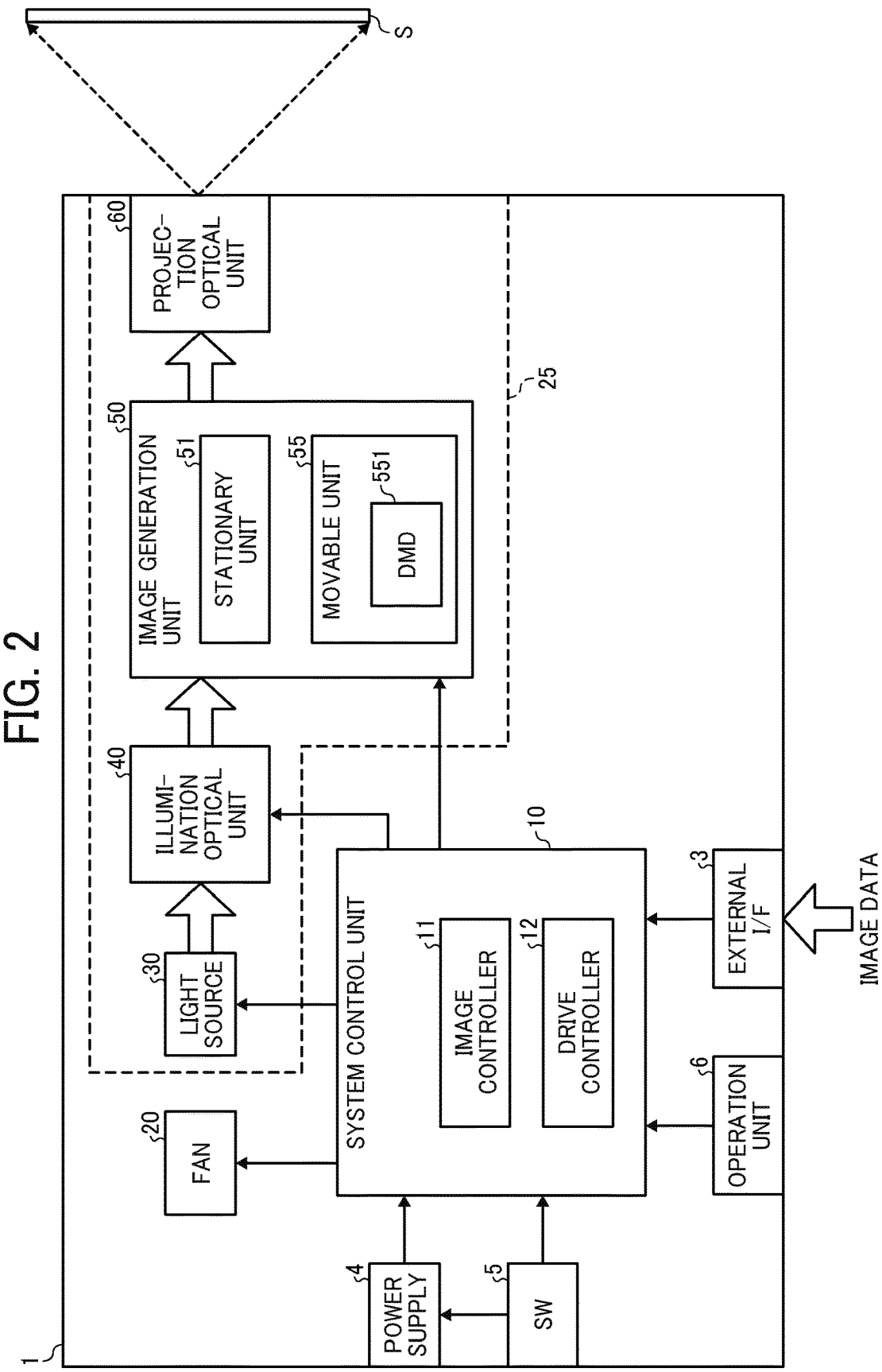
FIG. 2 is a block diagram of a configuration of a projector according to an embodiment of the present disclosure.

FIG. 2 is a block diagram of a configuration of the projector 1 according to an embodiment of the present disclosure. As illustrated in FIG. 2, the projector 1 includes the external I/F 3, a power supply 4, a main switch (SW) 5, an operation unit 6, a system control unit 10, a fan 20, and an optical engine 25.

The power supply 4 is connected to a commercial power supply, converts the voltage and frequency for an internal circuit of the projector 1, and supplies power to, e.g., the system control unit 10, the fan 20, the optical engine 25.

The main switch (SW) 5 is used for ON/OFF operation of the projector 1 by the user. When the main switch (SW) 5 is turned on while the power supply 4 is connected to the commercial power supply via, e.g., a power cord, the power supply 4 starts supplying power to parts of the projector 1. When the main switch (SW) 5 is turned off, the power supply 4 stops supplying power to parts of the projector 1.

The operation unit 6 includes, e.g., keys to accept various operations by the user, and is disposed, for example, on an upper surface of the projector 1. The operation unit 6 accepts operations by the user, such as adjustment of the size, color tone, and focus of the projection image. The user's operation accepted by the operation unit 6 is sent to the system control unit 10.

The external I/F 3 includes a connection terminal connected to, for example, a personal computer and a digital camera, and outputs image data transmitted from the connected device to the system control unit 10.

The system control unit 10 includes an image controller 11 and a drive controller 12. The system control unit 10 includes, for example, a central processing unit (CPU), a read only memory (ROM), and a random access memory (RAM). The function of each part of the system control unit 10 is realized, for example, by the CPU executing a program stored in the ROM in cooperation with the RAM.

Based on the image data input from the external I/F 3, the image controller 11 controls a digital micro mirror device (DMD) 551, which is an image generator disposed in an image generation unit 50 as an image generation device of the optical engine 25, to generate an image to be projected on the screen S.

The drive controller 12 controls a drive unit to move a movable unit 55 that is movably disposed in the image generation unit 50, and controls the position of the DMD 551 disposed in the movable unit 55.

The fan 20 is rotated under the control of the system control unit 10, to cool a light source 30 that is a lamp unit of the optical engine 25.

The optical engine 25 includes the light source 30, an illumination optical unit 40 as an image display device, the image generation unit 50 as the image generation device, and a projection optical unit 60, and projects an image onto the screen S under control of the system control unit 10.

The light source 30 is, for example, a mercury high pressure lamp, a xenon lamp, or a light emitting diode (LED) and is controlled by the system control unit 10 to irradiate the illumination optical unit 40 with light.

The illumination optical unit 40 includes, for example, a color wheel, a light tunnel, and a relay lens, and guides the light emitted from the light source 30 to the DMD 551 disposed in the image generation unit 50.

The image generation unit 50 includes a stationary unit 51 that is a stationary portion securely supported, and the movable unit 55 that is a movable part movably supported by the stationary unit 51. The movable unit 55 includes the DMD 551. The position of the movable unit 55 with respect to the stationary unit 51 is controlled by the drive controller 12 of the system control unit 10. The DMD 551 is an example of the image generation unit. The DMD 551 is controlled by the image controller 11 of the system control unit 10 and modulates the light guided by the illumination optical unit 40 to generate a projection image.

The projection optical unit 60 includes, for example, a plurality of projection lenses and mirrors and enlarges an image generated by the DMD 551 of the image generation unit 50 to project the image on the screen S.

<Optical Engine>

Figure 3:
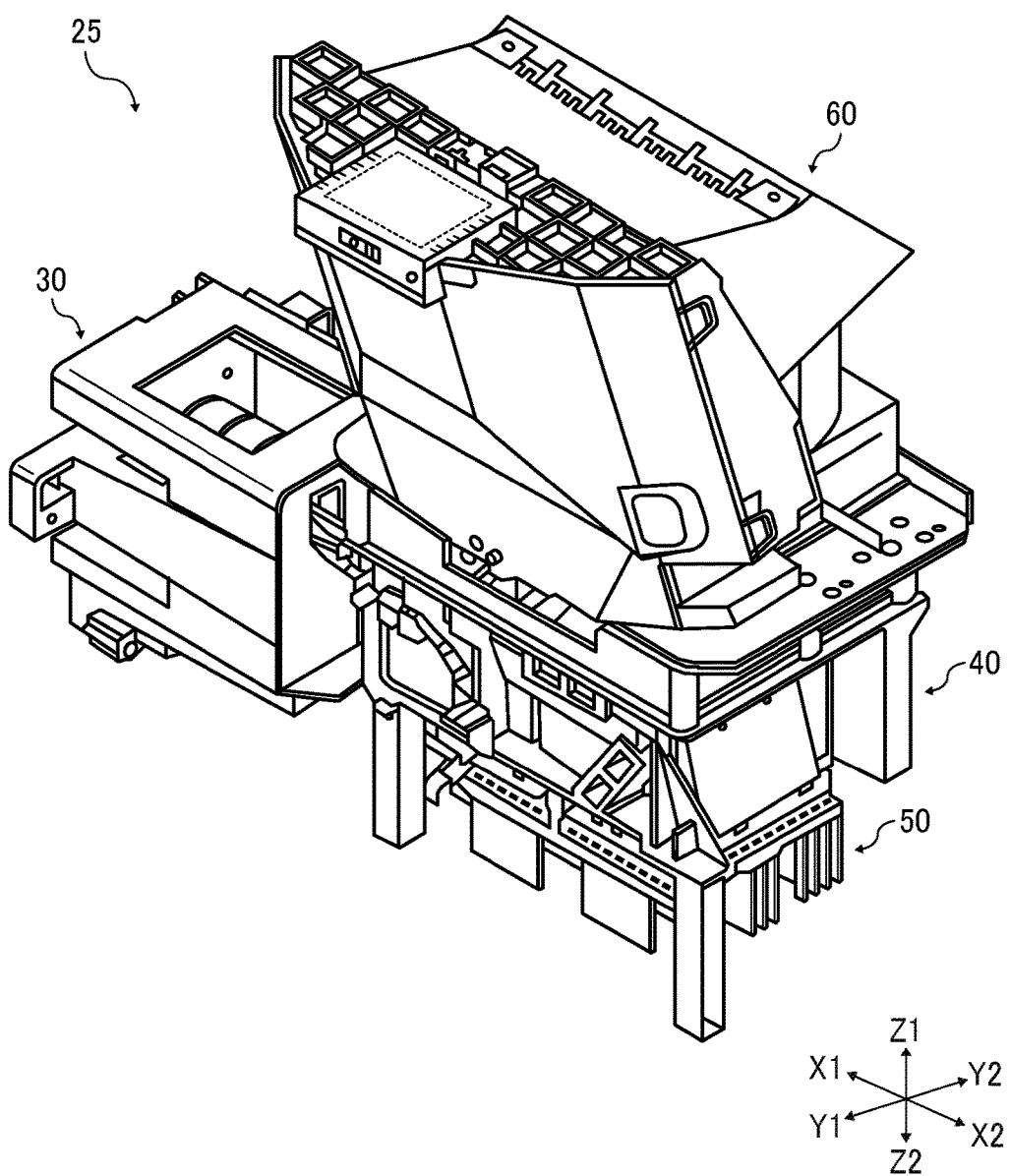
FIG. 3 is a perspective view of an optical engine according to an embodiment of the present disclosure.

Next, configurations of parts of the optical engine 25 are further described below. FIG. 3 is a perspective view of the optical engine 25 in an embodiment of the present disclosure. As illustrated in FIG. 3, the optical engine 25 is disposed inside the projector 1, and includes the light source 30, the illumination optical unit 40, the image generation unit 50, and the projection optical unit 60.

The light source 30 is disposed on a side surface of the illumination optical unit 40 and irradiates light in an X2 direction. The illumination optical unit 40 guides the light irradiated from the light source 30 to the image generation unit 50 disposed below the illumination optical unit 40. The image generation unit 50 generates a projection image using the light guided by the illumination optical unit 40. The projection optical unit 60 is disposed above the illumination optical unit 40 and projects the projection image generated by the image generation unit 50 to the outside of the projector 1.

The optical engine 25 according to the present embodiment is configured to project an image upward by using the light emitted from the light source 30. In some embodiments, the optical engine 25 may be configured to project an image in the horizontal direction.

Figure 4:
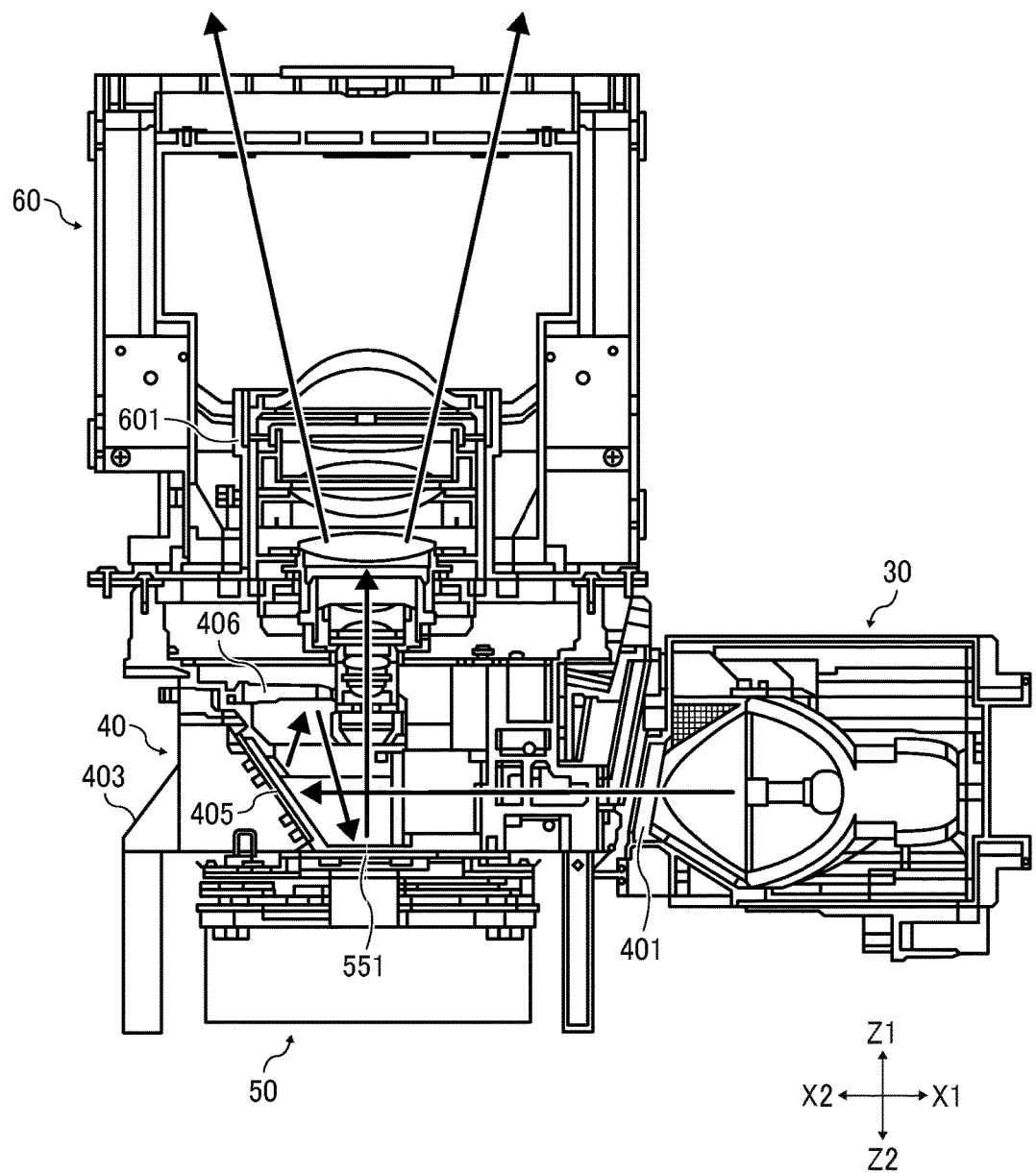
FIG. 4 is a schematic view of an internal configuration of an optical engine according to an embodiment of the present disclosure.
Figure 5:
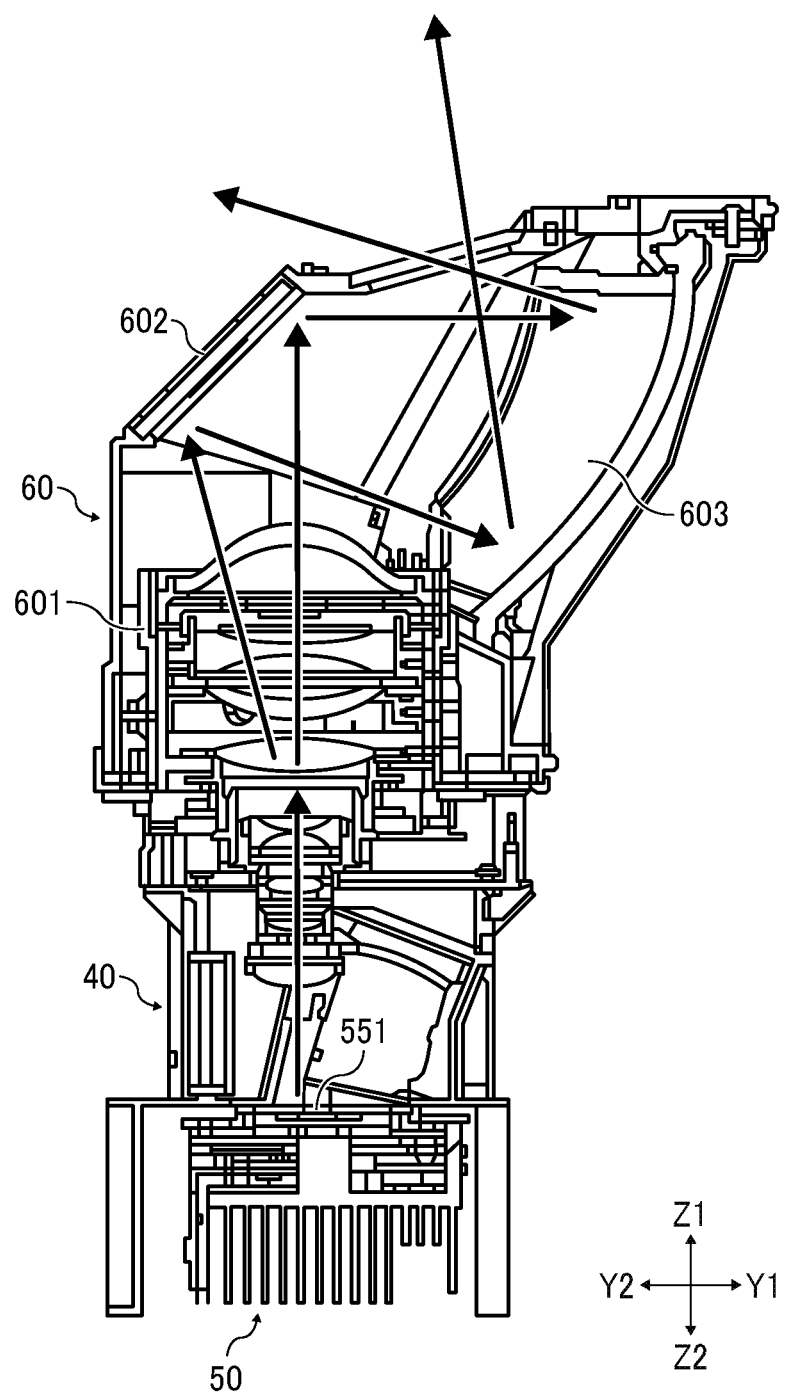
FIG. 5 is a schematic view of an internal configuration of the optical engine according to an embodiment of the present disclosure.

FIGS. 4 and 5 are schematic views of an internal configuration of the optical engine 25.

As illustrated in FIG. 4, the illumination optical unit 40 includes a color wheel 401, a plane mirror 405, and a concave mirror 406.

The color wheel 401 is, for example, a disk with filters of respective colors of; for example, R (red), G (green), and B (blue) in different portions in the circumferential direction. By rotating the color wheel 401 at high speed, the color wheel 401 time-divides the light emitted from the light source 30 into RGB colors. The plane mirror 405 and the concave mirror 406 reflect the light time-divided into RGB colors by the color wheel 401 to the DMD 551 provided in the image generation unit 50. A base 403 supports, for example, the color wheel 401, the plane mirror 405, and the concave mirror 406. The base 403 is fixed inside a housing of the projector 1.

In the illumination optical unit 40, for example, a light tunnel and a relay lens may be provided between the color wheel 401 and the plane mirror 405.

The image generation unit 50 includes the DMD 551. The DMD 551 modulates the reflected light from the concave mirror 406 to generate a projection image. The projection image generated by the DMD 551 is guided to the projection optical unit 60 through the illumination optical unit 40. A specific configuration of the image generation unit 50 is described later.

As illustrated in FIG. 5, in the projection optical unit 60, a projection lens 601, a return mirror 602, and a curved mirror 603 are provided inside a case.

The projection lens 601 includes a plurality of lenses, and focuses the projection image generated by the DMD 551 of the image generation unit 50 on the return mirror 602. The return mirror 602 and the curved mirror 603 reflect the focused projection image so as to enlarge the focused projection image, and project the focused projection image onto, e.g., the screen S outside the projector 1.

<Image Generation Unit>

Figure 6:
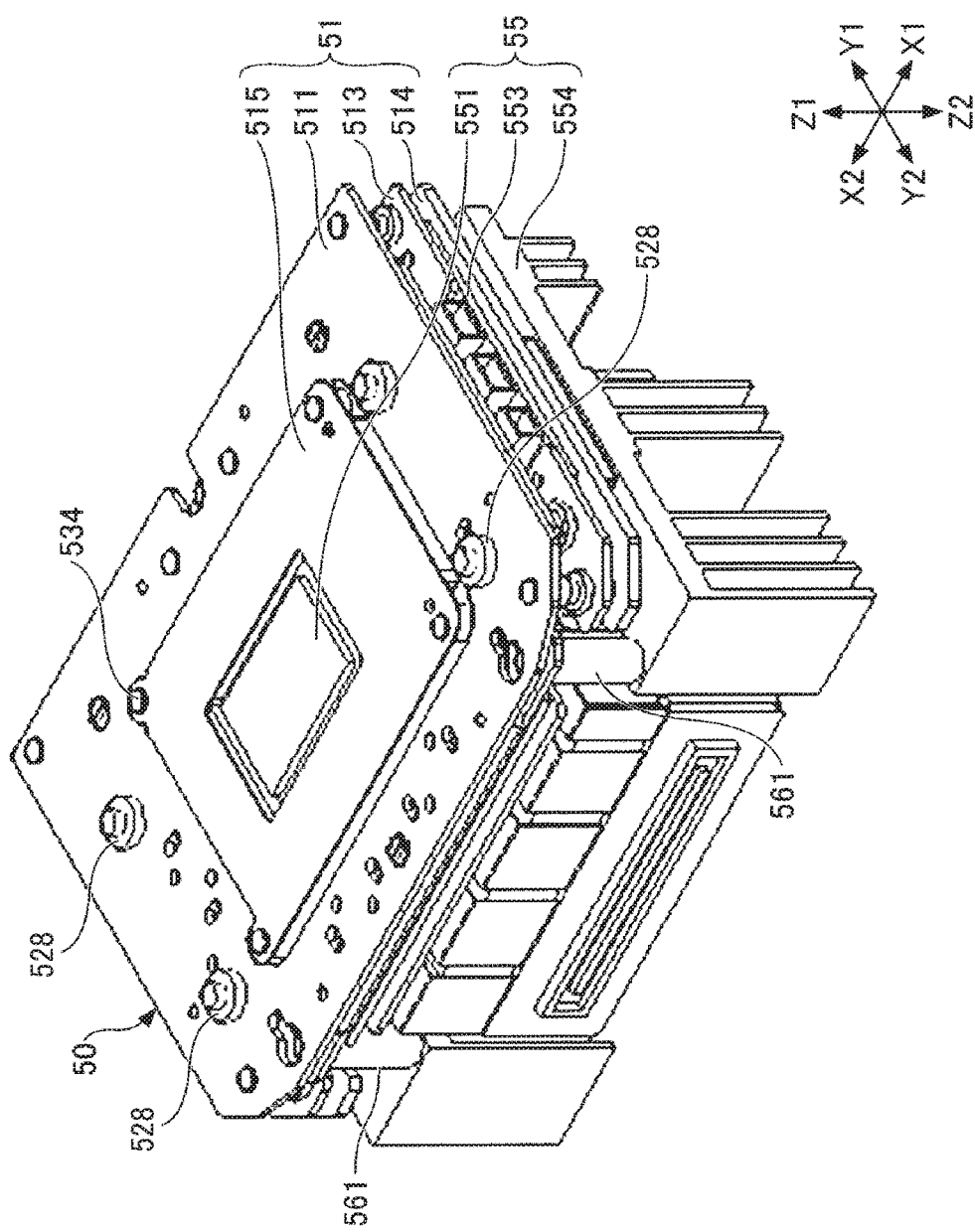
FIG. 6 is a perspective view of an image generation unit.
Figure 7:
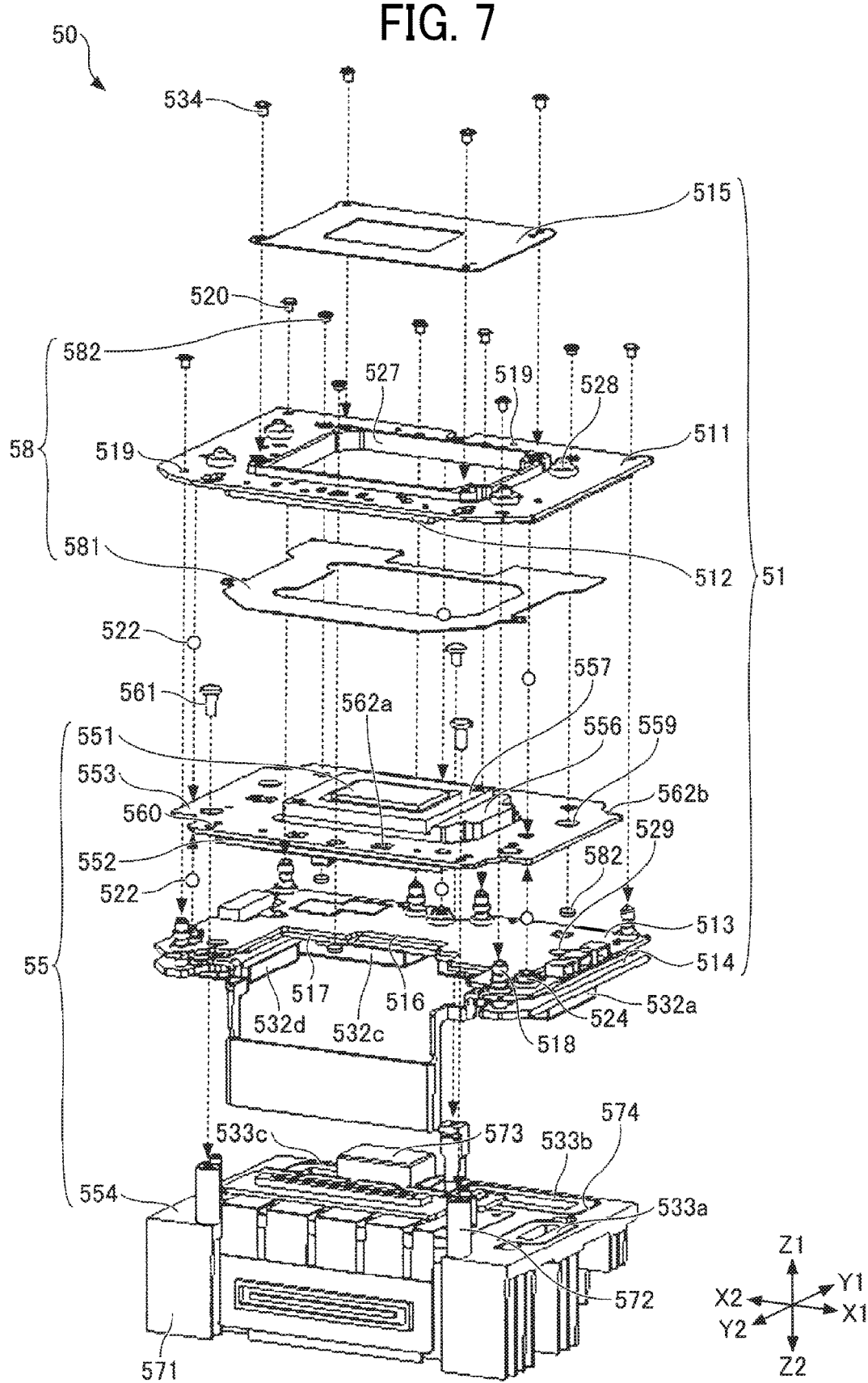
FIG. 7 is an exploded perspective view of the image generation unit of FIG. 6.
Figure 8:
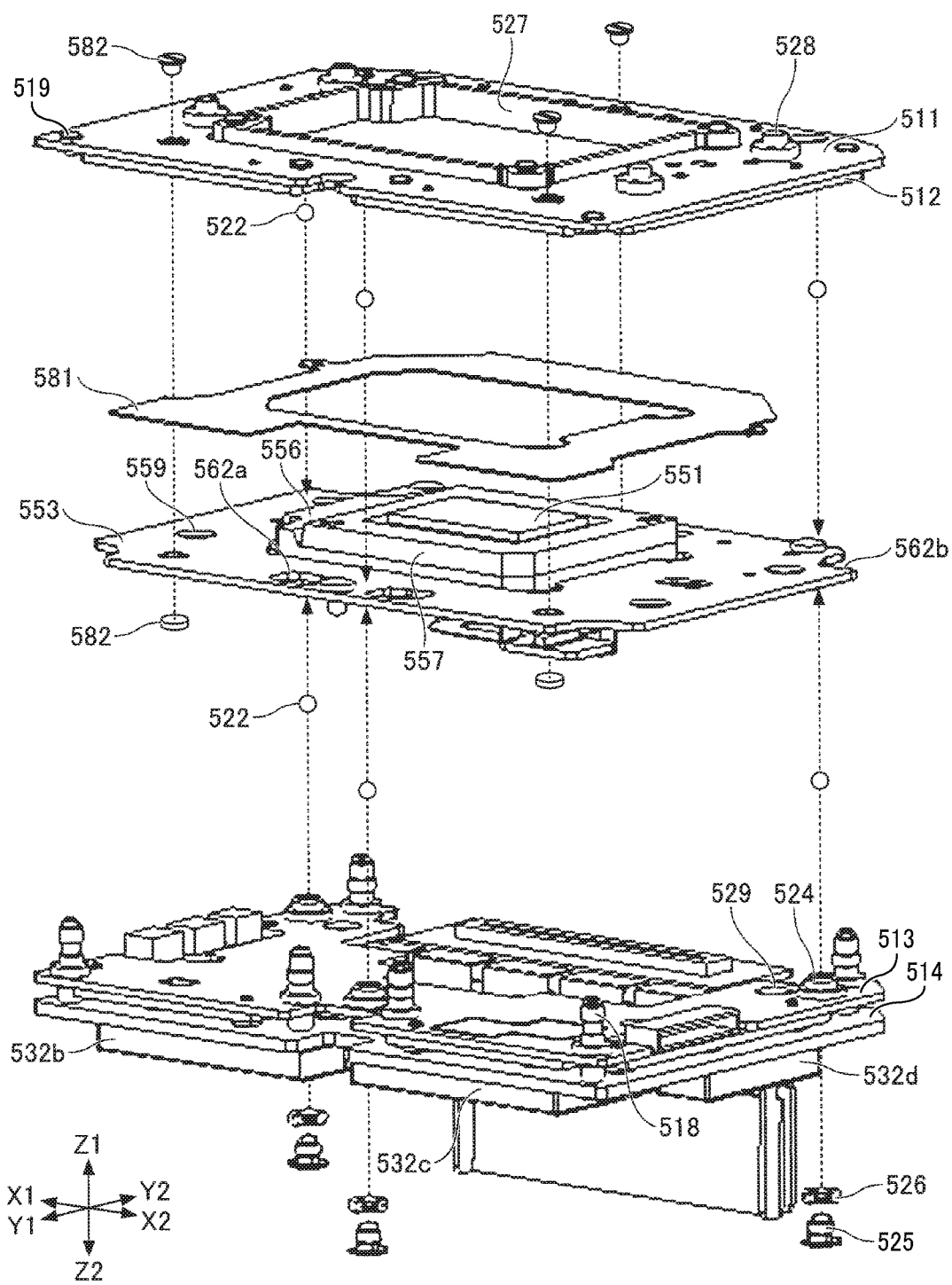
FIG. 8 is an exploded perspective view of a stationary unit.
Figure 14:
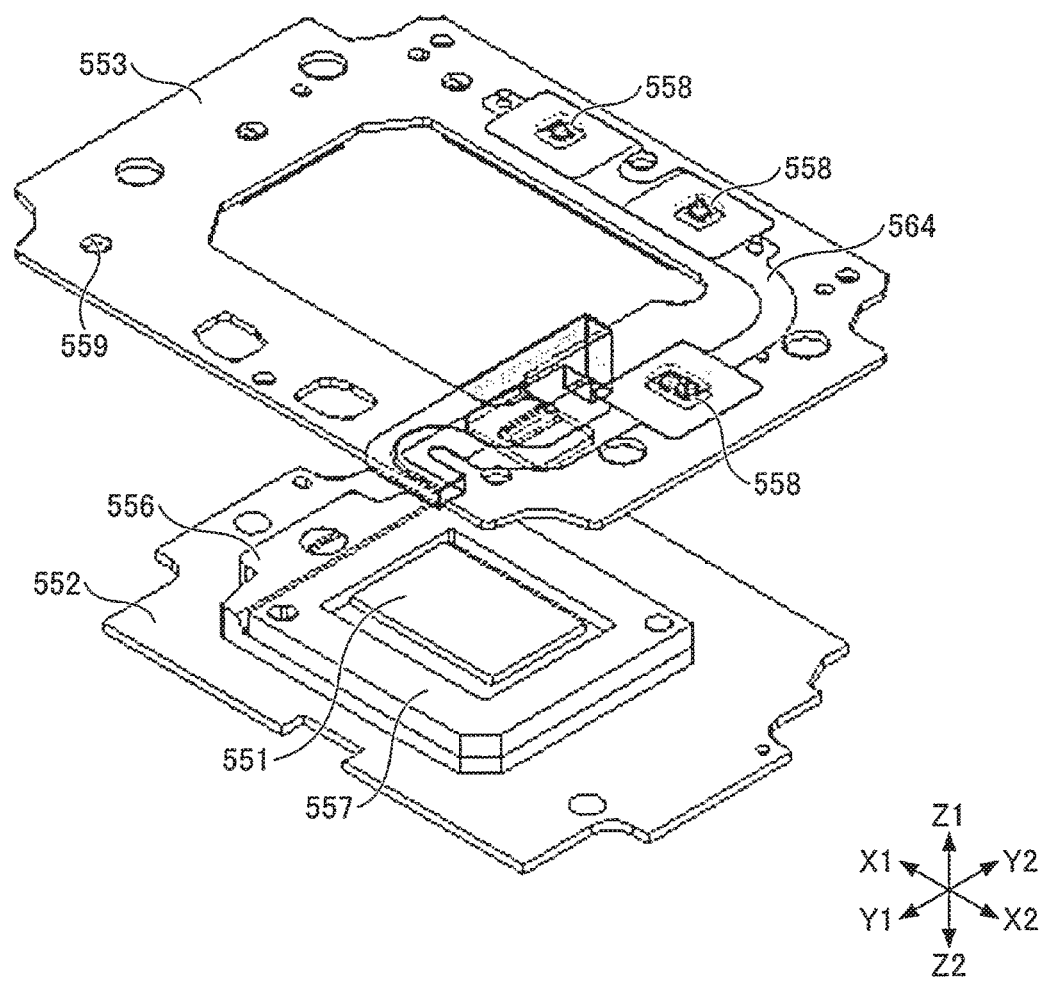
FIG. 14 is an exploded perspective view of the movable plate and a DMD substrate.

Next, the image generation unit 50 according to an embodiment of the present disclosure is further described. FIG. 6 is a perspective view of the image generation unit 50. FIG. 7 is an exploded perspective view of the image generation unit 50. FIG. 8 is an exploded perspective view of the stationary unit. In FIGS. 7 and 8, illustration of a position-detecting flexible printed circuit board (position detecting FPC) disposed on an upper surface (a surface on the side closer to the top plate 511) of a movable plate is omitted, and the position detecting FPC is illustrated in FIG. 14.

As illustrated in FIGS. 6 to 8, the image generation unit 50 includes the stationary unit 51, the movable unit 55, and a dustproof unit 58. The stationary unit 51, the movable unit 55, and the dustproof unit 58 are described below Stationary Unit The stationary unit 51 includes a top plate 511 as a first stationary plate, an intermediate plate 512, a base plate 513 as a second stationary plate, a sub plate 514, and a DMD mask 515 as a cover member In the stationary unit 51, the top plate 511 is fixedly supported on a lower surface of the base 403 (see FIG. 4) of the illumination optical unit 40 (see FIG. 4).

The top plate 511, the intermediate plate 512, the base plate 513, and the sub plate 514 are flat-shaped plate members, and are made of a magnetic material (s), such as iron and ferritic stainless steel.

The top plate 511 includes a center hole 527 at a position corresponding to the DMD 551 of the movable unit 55. The base plate 513 and the sub plate 514 include a central groove 516 and a central groove 517, respectively, in portions opposed to the DMD 551 disposed on the DMD substrate 552. The heat transfer portion 573 of the heat sink 554 is inserted into the central groove 516 and the central groove 517.

The intermediate plate 512 is disposed on the lower surface (the surface on the side closer to the base plate 513) of the top plate 511, and is fixed to the lower surface of the top plate 511. The intermediate plate 512 is formed so as to surround the periphery of the DMD 551, and has a center hole in a portion corresponding to the DMD 551. Therefore, the intermediate plate 512 narrows the gap between the top plate 511 and a movable plate 553, thus reducing the dust entering from the gap and adhering to the DMD 551. Further, since the intermediate plate 512 holds support balls 522 on a side closer to the top plate 511 in the through hole 521, the intermediate plate 512 functions to regulate movement positions of the support balls 522 on the side closer to the top plate 511.

The base plate 513 is disposed with a predetermined gap at a lower side (a surface closer to the heat sink 554) of the intermediate plate 512 and is fixed by a plurality of supports 518.

The sub plate 514 is disposed on a lower surface of the base plate 513 with a predetermined gap formed by the plurality of supports 518.

The DMD mask 515 is disposed on an upper surface of the top plate 511 around the center hole 520 and fixed to top plate 511 by screws 534.

The top plate 511 and the base plate 513 are disposed in parallel via a predetermined gap by the plurality of (in the present embodiment, six) supports 518. An upper end portion of the support 518 is press-fitted into a support hole 519 of the top plate 511, and a lower end portion of the support 518, at which an external thread is formed, is inserted into a support hole of the base plate 513. Then, the support 518 is fixed by screws 520. The support 518 forms a certain gap between the top plate 511 and the base plate 513 and supports the top plate 511 and the base plate 513 in parallel. Accordingly, the top plate 511 is disposed in parallel with the base plate 513 via a predetermined gap.

The top plate 511 and the base plate 513 support the movable plate 553 movably in a direction parallel to a plane of the movable plate 553 between the top plate 511 and the base plate 513. The supporting structure of the movable plate 553 is further described.

Figure 11:
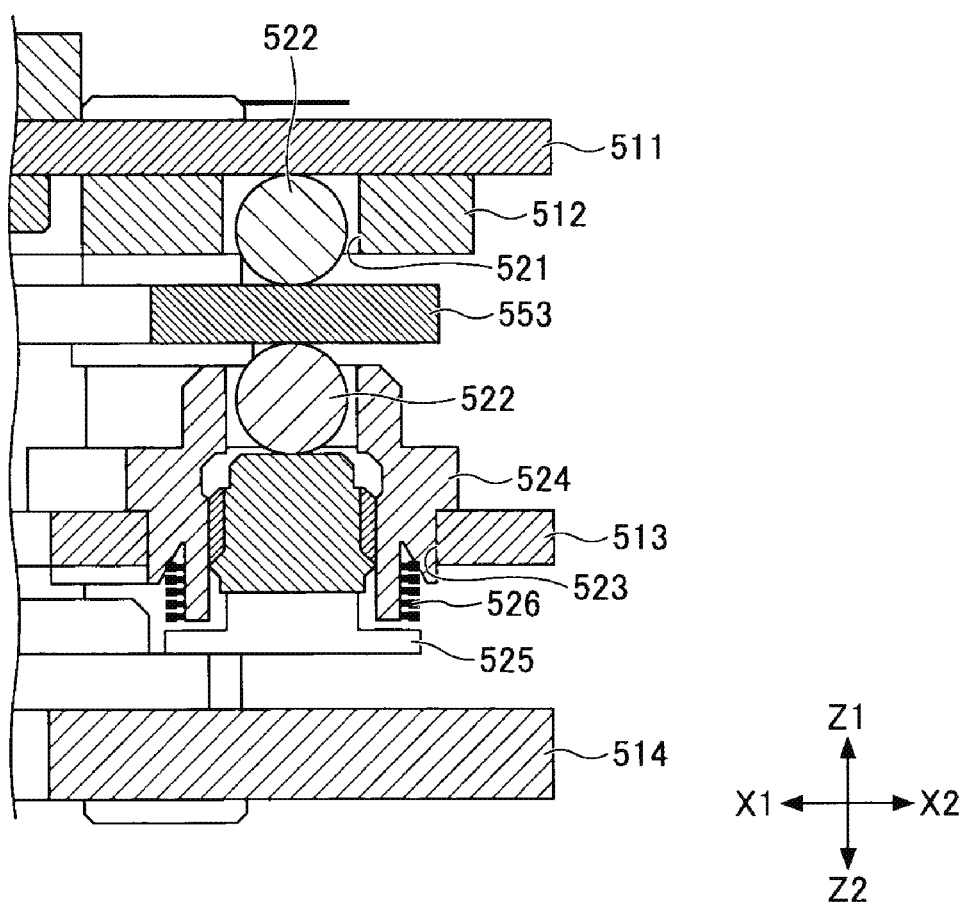
FIG. 11 is a partially enlarged view of a region indicated by RS of FIG. 10.

FIG. 9 is a plan view of the image generation unit 50 viewed from the top plate 511 side. FIG. 10 is a cross-sectional view of the image generation unit 50 cut along a line A-A in FIG. 9. FIG. 11 is a partially enlarged view of a region indicated by RS of FIG. 10. As illustrated in FIGS. 9 to 11, the intermediate plate 512 has a plurality of through holes 521 that pass through the intermediate plate 512 in the vertical direction. A recess is formed by the lower surface of the top plate 511 and the through hole 521 of the intermediate plate 512. The support ball 522 is inserted into the through hole 521, and the through hole 521 rotatably holds the support ball 522.

The base plate 513 has a plurality of support holes 523 that pass through of the base plate 513 in the vertical direction. The support holes 523 are formed in the base plate 513 so as to correspond to the through holes 521, respectively, of the top plate 511. In the support hole 523 of the base plate 513, a cylindrical ball receiving portion (base member) 524 having a female thread on the lower inner circumferential surface thereof is inserted from the top plate 511 side and is seated on the base plate 513. A position adjustment screw 525 has a male thread on an outer periphery thereof. The position adjustment screw 525 is inserted into the base member 524 via a spring 526 from a side opposite to the top plate 511, and screwed at a lower end of the base member 524. As a result, the support ball 522 is rotatably held in a space formed by the base member 524 and the position adjustment screw 525.

Each support ball 522 is rotatably held by the through hole 521 of the intermediate plate 512 and the base member 524 of the base plate 513, and at least a portion of the support ball 522 projects beyond the through hole 521 and the base member 524. Accordingly, each support ball 522 contacts the movable plate 553 disposed between the top plate 511 and the base plate 513.

Three through holes 521 of the top plate 511 and three base members 524 of the base plate 513 are disposed, so that three pairs of support balls 522 are disposed between the top plate 511 and the base plate 513. Accordingly, the three pairs of support balls 522 pinch and support the movable plate 553 between the top plate 511 and the base plate 513 at three positions of the movable plate 553. The movable plate 553 is supported from both sides of the movable plate 553 by the support balls 522 so as to be movable in a direction parallel to the top plate 511 and the base plate 513 and parallel to the surface of the movable plate 553. The support balls 522 also pinch the movable plate 553 in a state of point contact with the movable plate 553 from both sides of the movable plate 553. Such a configuration can reduce friction of the movable plate 553 with the support balls 522 when the movable plate 553 moves.

The amount of projection of the support ball 522, which is disposed in the base member 524, from an upper end of the base member 524 varies as the position of the position adjustment screw 525 displaces in the Z1 direction or the Z2 direction. Accordingly, the distance between the base plate 513 and the movable plate 553 can be appropriately adjusted by changing the amount of projection of the support ball 522 using the position adjustment screw 525.

Note that the number and positions of the supports 518 and the support balls 522 disposed in the stationary unit 51 are not limited to the configuration exemplified in the present embodiment.

Further, the base plate 513 includes through holes 529 through which screws 528 to fix the top plate 511 to the illumination optical unit 40 (see FIGS. 2 to 5) are inserted. Other configurations of the stationary unit 51 are described with reference to FIGS. 6 to 8.

On the lower surface (the surface on the heat sink 554 side) of the intermediate plate 512, position detection magnets are disposed at a plurality of positions. Each of the position detecting magnets 531 is made of a rectangular parallelepiped pen magnet and forms a magnetic field extending to the movable plate 553 disposed between the top plate 511 and the base plate 513.

Figure 12:
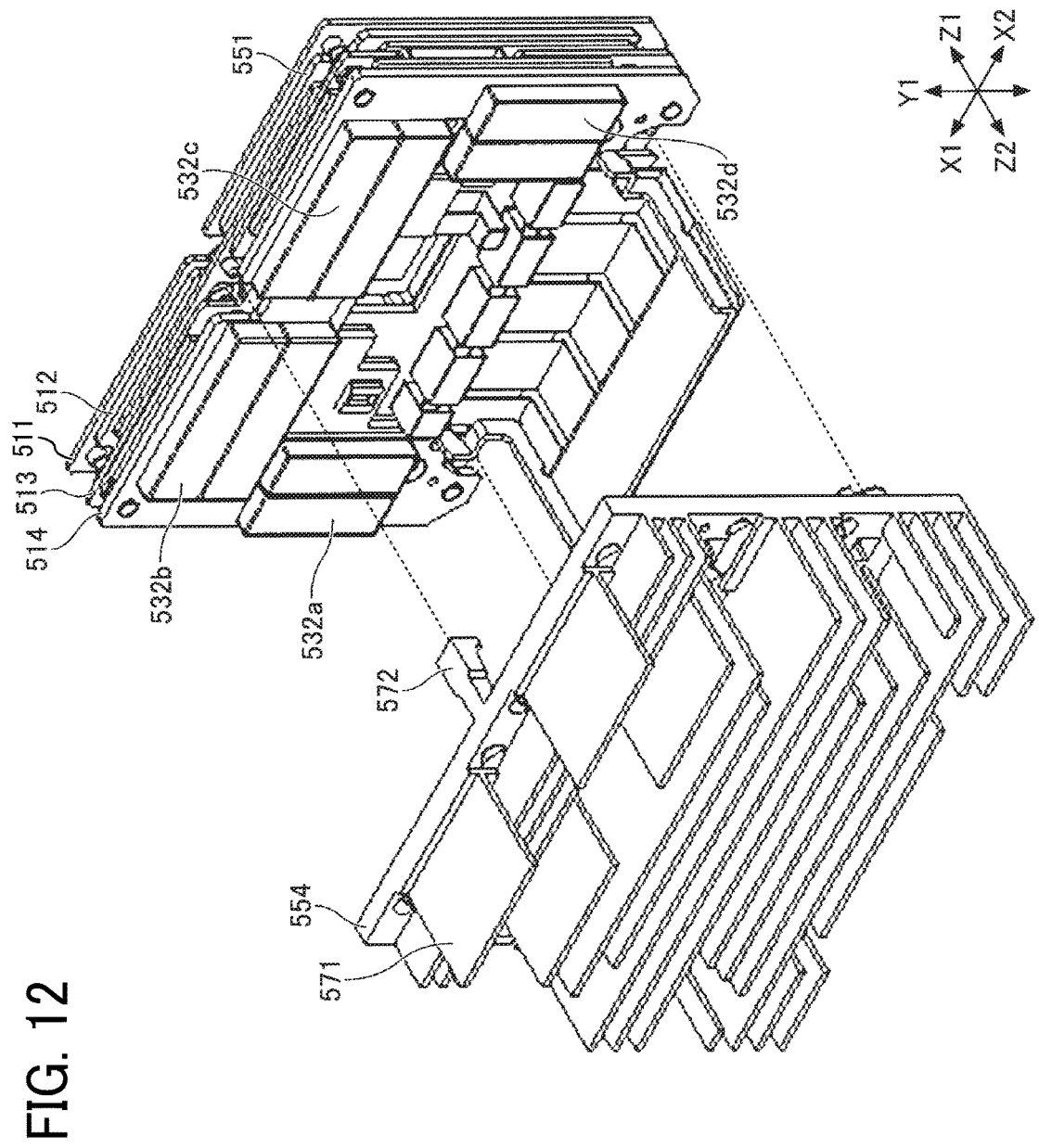
FIG. 12 is a perspective view of a movable unit seen from a bottom surface side of a heat sink.

As illustrated in FIG. 12, the driving magnets 532a, 532b, 532c, and 532d (hereinafter, may be simply referred to as "driving magnets 532") are disposed on the lower surface (the surface on the heat sink 554 side) of the sub plate 514.

Figure 13:
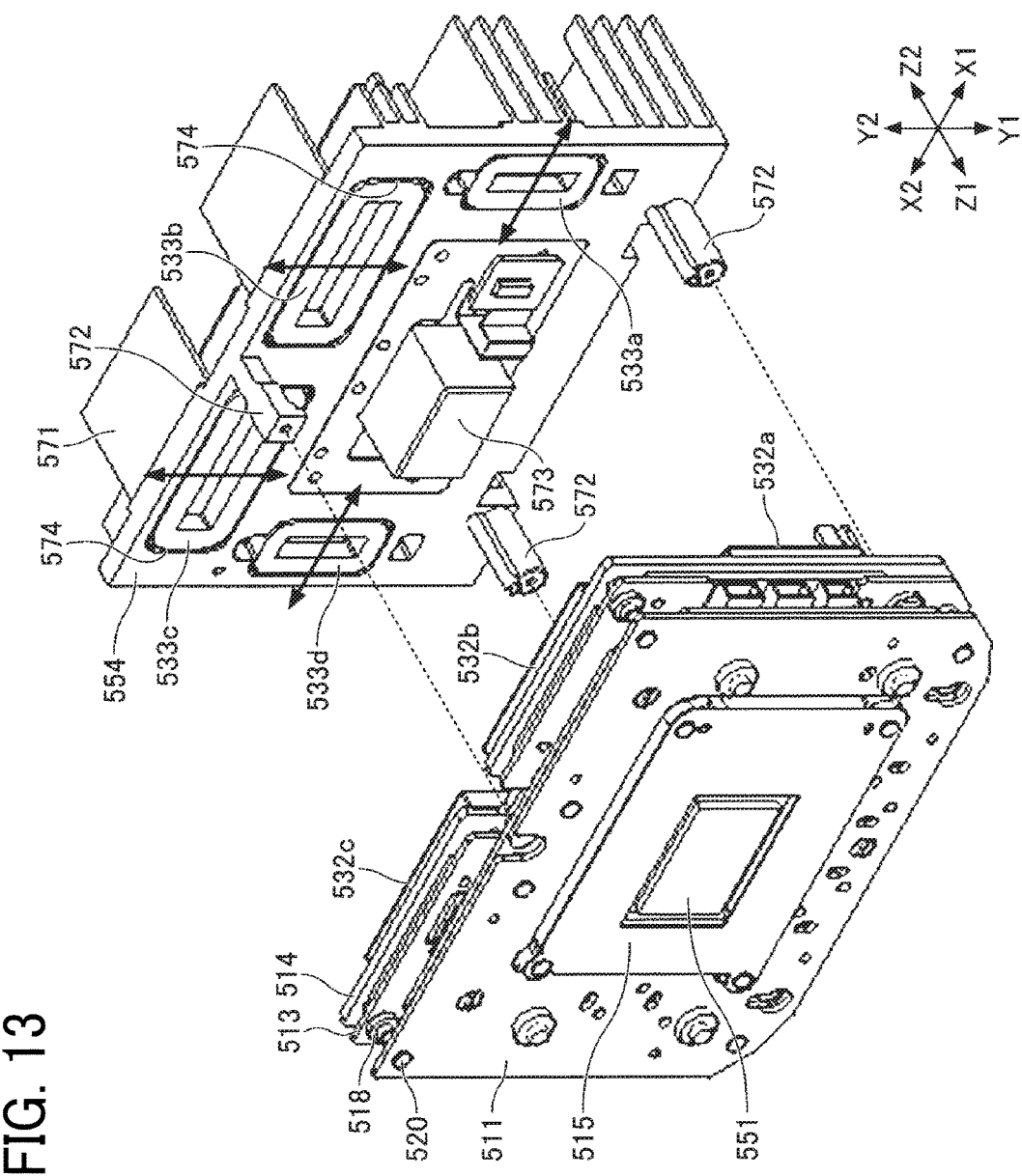
FIG. 13 is a perspective view of the heat sink seen from a top plate side.

The driving magnets 532 are disposed at four positions so as to surround the central groove 516 of the base plate 513 and the central groove 517 of the sub plate 514. As illustrated in FIG. 13, the driving magnets 532 are opposed to driving coils 533a, 533b, 533c, and 533d (hereinafter, may be simply referred to as "driving coils 533") disposed in recesses 574 of the heat sink 554. The driving magnets 532 are two pairs of two rectangular parallelepiped magnets arranged so that the longitudinal directions of the two rectangular parallelepiped magnets are parallel to each other. Each of the driving magnets 532 forms a magnetic field extending to the heat sink 554.

The driving magnets 532 and the driving coils 533 constitute a driver to move the movable plate 553.

Movable Unit

As illustrated in FIGS. 6 to 8, the movable unit 55 includes the DMD 551, the DMD substrate 552 as a first movable plate, the movable plate 553 as a second movable plate, and the heat sink 554 as a diffusion heat radiator. The movable unit 55 is movably supported by the stationary unit 51.

The DMD 551 is disposed on the upper surface (the surface opposite to the top plate 511) of the DMD substrate 552. The DMD 551 is exposed to the upper surface side of the movable plate 553 through the center hole 527 of the top plate 511. The DMD 551 is connected to the DMD substrate 552 via a socket 556. The outer periphery of the DMD 551 is covered by a cover 557. The DMD 551 has an image generation surface in which a plurality of movable micromirrors are arranged in a lattice pattern. Each micromirror of the DMD 551 is disposed so that a mirror surface can tilt around a torsion axis. The driving of each micromirror of the DMD 551 is turned ON/OFF based on an image signal transmitted from the image controller 11 (see FIG. 1) of the system control unit 10 (see FIG. 1).

For example, when the micromirror is "ON", the inclination angle of the micromirror is controlled so as to reflect the light from the light source 30 (see FIGS. 2 to 4) to the projection optical unit 60 (see FIGS. 2 to 4). On the other hand, for example, when the micromirror is "OFF", the inclination angle of the micromirror is controlled in such a direction as to reflect the light from the light source 30 (see FIGS. 2 to 4) toward a OFF light plate.

As described above, the DMD 551 controls the inclination angle of each micromirror according to the image signal transmitted from the image controller 11 (see FIG. 2). The light irradiated from the light source 30 (see FIGS. 2 to 4) and passing through the illumination optical unit 40 (see FIGS. 2 to 4) is modulated to generate a projection image.

The DMD substrate 552 is disposed between the top plate 511 and the base plate 513 of the stationary unit 51, and is connected to the lower surface of the movable plate 553. The DMD substrate 552 displaces together with the movable plate 553.

The DMD 551 is disposed on the upper surface of the DMD substrate 552. The DMD 551 is connected to the DMD substrate 552 via the socket 556. The outer periphery of the DMD 551 is covered by the cover 557.

In the DMD substrate 552, cutouts are formed at portions opposed to connection posts 572 of the heat sink 554 so that the movable plate 553 is connected to the connection posts 572 of the heat sink 554.

For example, when the movable plate 553 and the DMD substrate 552 are jointly fastened to the heat sink 554 by the connection post 572, the DMD substrate 552 might deform, thus causing the image generation surface of the DMD 551 to be inclined with respect to the movement direction and distort an image. In the present embodiment, the cutouts are formed in a peripheral portion of the DMD substrate 552 so that the connection posts 572 of the heat sink 554 are connected to the movable plate 553 while avoiding the DMD substrate 552. Accordingly, the heat sink 554 is connected to the movable plate 553, thus reducing the possibility of occurrence of distortion due to receiving the load from the heat sink 554 on the DMD substrate 552.

Therefore, the image generation surface of the DMD 551 is kept to be parallel to the movement direction, thus allowing the image quality to be maintained.

The cutouts of the DMD substrate 552 are formed so as not to contact the base member 524 of the base plate 513 so that the support balls 522 held by the base plate 513 contact the movable plate 553 while avoiding the DMD substrate 552. Thus, contacting of the DMD substrate 552 with the support balls 522 can suppress the occurrence of, e.g., distortion in the DMD substrate 552. Accordingly, the image generation surface of the DMD 551 can be kept to be parallel to the movement direction, thus maintaining the image quality.

Note that, instead of the cutouts, for example, through holes may be formed in the DMD substrate 552 as long as the through holes are shaped so as to prevent the DMD substrate 552 from contacting the connection posts 572 of the heat sink 554 and the support balls 522.

The movable plate 553 is disposed between the top plate 511 and the base plate 513 of the stationary unit 51 and supported so as to be movable in the direction parallel to the surface of the movable plate 553 by the three support balls 522 as described above.

The movable plate 553 is formed of a flat plate member, and the center hole 570 is formed at a position corresponding to the DMD 551 disposed on the DMD substrate 552. Through holes 559, through which the screws 528 to fix the top plate 511 to the illumination optical unit 40 are inserted, are formed in the movable plate 553.

The interval between the movable plate 553 and the DMD 551 are adjusted with screws inserted into the connection holes so that the surface of the movable plate 553 and the image generation surface of the DMD 551 are parallel to each other. In such a state, the movable plate 553 and the DMD substrate 552 are fixed to each other with an adhesive.

The movable plate 553 has connection holes 560 at positions corresponding to the connection posts 572 of the heat sink 554. The movable plate 553 is fixed to the upper ends of the connection posts 572 together with the DMD substrate 552 by screws 561 inserted into the connection holes 560.

When the movable plate 553 moves parallel to the surface, the DMD substrate 552 connected to the movable plate 553, the heat sink 554, and the DMD 551 disposed on the DMD substrate 552 also move together with the movable plate 553. Accordingly, when the surface of the movable plate 553 is not parallel to the image generation surface of the DMD 551, the image generation surface of the DMD 551 might be inclined with respect to the movement direction, thus causing a distorted image. In the present embodiment, the interval between the movable plate 553 and the DMD substrate 552 is adjusted and the surface of the movable plate 553 and the image generation surface of the DMD 551 are kept parallel to each other. Such a configuration can suppress deterioration in image quality.

In addition, the movable plate 553 has a movable-range restriction hole 562a and a movable-range restriction groove 562b at positions corresponding to the supports 518 of the stationary unit 51. The movable plate 553 might be greatly displaced due to, for example, vibration or some abnormality in a state in which the supports 518 of the stationary unit 51 are disposed in the movable-range restriction hole 562a and the movable-range restriction groove 562b. In such a case, the movable range of the movable plate 553 is restricted by the movable plate 553 contacting the supports 518.

Note that, for example, the number, position, and shape of each of the movable-range restriction hole 562a and the movable-range restriction groove 562b are not limited to the configurations exemplified in the present embodiment. For example, the number of each of the movable-range restriction hole 562a and the movable-range restriction groove 562b may be one or plural. Further, the shape of each of the movable-range restriction hole 562a and the movable-range restriction groove 562b may be different from the shape of the present embodiment and may be, for example, rectangle or circular. In addition, the movable plate 553 and the DMD substrate 552 may be connected to each other with a configuration different from the configuration of the present embodiment.

Further, a position detecting FPC 564 illustrated in FIG. 14 is disposed on the upper surface (surface on the top plate 511 side) of the movable plate 553. On the upper surface (the surface on the top plate 511 side) of the position detection FPC 564, Hall elements 558 as magnetic sensors are disposed at positions facing the position detection magnets disposed on the lower surface (the surface on the heat sink 554 side) of the intermediate plate 512. The Hall elements 558 together with the position detection magnets constitute a position detector to detect the position of the DMD 551. In FIG. 14, the position detecting FPC 564 is indicated by hatching.

The heat sink 554 includes heat radiating portions 571, the connection posts 572, and the heat transfer portion 573. The heat radiating portion 571 has a plurality of fins in a lower portion thereof, and dissipates the heat generated in the DMD 551. As illustrated in FIG. 13, the recesses 574, on which the driving coils 533a, 533b, 533c, and 533d are mounted, are formed on upper surfaces of the heat radiating portions 571.

The recesses 574 are formed at positions facing the driving magnets 532 disposed on the lower surface of the base plate 513. The driving coils 533 face the driving magnets 532 disposed on the lower surface of the base plate 513.

The connection posts 572 are disposed at three positions on the periphery of the upper surface of the heat sink 554 so as to extend in the Z1 direction from the upper surfaces of the heat radiating portions 571. The movable plate 553 is coupled and fixed to the upper ends of the connection posts 572 by screws 561 inserted into the connection holes 560 of the movable plate 553. The connection posts 572 are connected to the movable plate 553 by the cutouts of the DMD substrate 552 without contacting the DMD substrate 552.

The heat transfer portion 573 is at a position opposed to the DMD 551 and is a columnar member extending from the upper surface of the heat radiating portion 571 in the Z1 direction. The heat transfer portion 573 of the heat sink 554 is inserted through the central groove 516 of the base plate 513 and the center groove 517 of the sub plate 514 (see FIG. 7) and contacts a bottom surface of the DMD 551. The heat transfer portion 573 of the heat sink 554 contacts the bottom surface of the DMD 551 to transfer the heat generated in the DMD 551 to the heat radiating portion 571 and radiate heat, thus cooling the DMD 551. Suppressing the temperature rise of the DMD 551 by the heat sink 554 can reduce occurrence of troubles, such as malfunctions or failures due to the temperature rise of the DMD 551.

To enhance the cooling effect of the DMD 551, for example, an elastically deformable heat transfer sheet may be disposed between the upper surface of the heat transfer portion 573 and the DMD 551, for example, between the heat transfer portion 573 of the heat sink 554 and the DMD

551. The heat transfer sheet improves the thermal conductivity between the heat transfer portion 573 of the heat sink 554 and the DMD 551 and improves the cooling effect of the DMD 551.

The heat sink 554 is disposed to move together with the movable plate 553 and the DMD substrate 552. Since the heat transfer portion 573 is constantly in contact with the DMD 551, the heat sink 554 can constantly radiate the heat generated in the DMD 551 and efficiently cool the DMD 551.

In the present embodiment, in the image generation unit 50, the driving force for moving the movable unit 55 is generated by the top plate 511, the base plate 513, the sub plate 514, and the movable plate 553.

Through holes of the top plate 511, the through holes 559 of the movable plate 553, and the through holes 529 of the base plate 513 are formed so as to face each other in the Z1-Z2 direction. The screws 528 to fix the top plate 511 to the illumination optical unit 40 are inserted into the through holes of the top plate 511, the through holes 559 of the movable plate 553, and the through holes 529 of the base plate 513.

A space corresponding to the thickness of the socket 556 and the DMD 551 is generated between the surface of the DMD substrate 552 and the image generation surface of the DMD 551. Accordingly, for example, if the DMD substrate 552 is disposed above the top plate 511, the space from the surface of the DMD substrate 552 to the image generation surface of the DMD 551 would be a dead space, and the device configuration might become large.

In the present embodiment, the DMD substrate 552 is disposed between the top plate 511 and the base plate 513, and the top plate 511 is disposed in the space from the surface of the DMD substrate 552 to the image generation surface of the DMD 551. Accordingly, since the space from the surface of the DMD substrate 552 to the image generation surface of the DMD 551 can be effectively utilized, the height of the image generation unit 50 in the Z1-Z2 direction can be reduced and the image generation unit 50 can be downsized. Therefore, the image generation unit 50 can be assembled not only to a large-sized projector but also to a small-sized projector, thus enhancing versatility.

At least one of the top plate 511, the DMD substrate 552, the movable plate 553, and the base member 524 is preferably made of a conductive material, such as stainless steel, aluminum, and magnesium alloy. Thus, for example, electrical noise generated in the DMD 551 and the DMD substrate 552 is released to, for example, the housing of the illumination optical unit 40 through the top plate 511 and the DMD substrate 552. Such a configuration can reduce noise leakage to the outside.

Driver In the present embodiment, as illustrated in FIGS. 6 to 8, the image generation unit 50 includes the driving magnets 532 disposed on the sub plate 514 and the driving coils 533 disposed on the heat sink 554. The driving magnets 532 and the driving coils 533 constitute the driver. The driving magnets 532 and the driving coils 533 are disposed so as to be opposed to each other between the sub plate 514 and the heat sink 554.

As illustrated in FIG. 12, the driving magnet 532*b* and the driving magnet 532*c* are two permanent magnets, each having a longitudinal direction parallel to the X1-X2 direction. The driving magnet 532*a* and the driving magnet 532*d* are two permanent magnets, each having a longitudinal direction parallel to the Y1-Y2 direction. Each of the driving magnets 532 forms a magnetic field extending to the heat sink 554.

Each of the driving coils 533 is formed by winding an electric wire around an axis parallel to the Z1-Z2 direction and is mounted to the recess 574 formed on the upper surface of the heat radiating portion 571 of the heat sink 554.

The driving magnets 532 of the sub plate 514 and the driving coils 533 of the heat sink 554 are arranged so as to face each other in a state in which the movable unit 55 is supported by the stationary unit 51. When a current is supplied to the driving coil 533, a Lorentz force serving as a driving force to move the movable unit 55 is generated in the driving coil 533 by the magnetic fields formed by the driving magnets 532.

When the Lorentz force is transmitted to the heat sink 554, the movable plate 553 also displaces according to the displacement of the heat sink 554 since the heat sink 554 is connected to the movable plate 553. Accordingly, the movable unit 55 receives the Lorentz force generated between the driving magnets 532 and the driving coils 533 and is displaced linearly or rotationally in the X-Y plane with respect to the stationary unit 51.

In the present embodiment, the driving coil 533*a* and the driving magnet 532*a*, the driving coil 533*d* and the driving magnet 532*d* are disposed so as to be opposed to each other in the X1-X2 direction. When current is passed through the driving coil 533*a* and the driving coil 533*d*, a Lorentz force in the X1 direction or the X2 direction is generated, as illustrated in FIG. 13. The movable plate 553 moves in the X1 direction or the X2 direction due to the Lorentz force generated in the driving coil 533*a* and the driving magnet 532*a* and the Lorentz force generated in driving coil 533*d* and the driving magnet 532*d*.

In addition, in the present embodiment, the driving coil 533*b* and the driving magnet 532*b* are arranged side by side in the X1-X2 direction, and the driving coil 533*c* and the driving magnet 532*c* are arranged side by side in the X1-X2 direction. The driving magnet 532*b* and the driving magnet 532*c* are arranged such that the longitudinal directions of the driving magnet 532*b* and the driving magnet 532*c* are perpendicular to the longitudinal directions of the driving magnet 532*a* and the driving magnet 532*d*, respectively. In such a configuration, when current is passed through the driving coil 533*b* and the driving coil 533*c*, a Lorentz force in the Y1 direction or Y2 direction is generated as illustrated in FIG. 13.

The movable plate 553 moves in the Y1 direction or the Y2 direction by the Lorentz force generated in the driving coil 533*b* and the driving magnet 532*b* and the Lorentz force generated in the driving coil 533*c* and the driving magnet 532*c*. The movable plate 553 is displaced so as to rotate in the XY plane by the Lorentz forces generated in the opposite directions between the pair of the driving coil 533*b* and the driving magnet 532*b* and the pair of the driving coil 533*c* and the driving magnet 532*c*.

For example, a Lorentz force in the Y1 direction is generated in the driving coil 533*b* and the driving magnet 532*b*, and a current flows so that a Lorentz force in the Y2 direction is generated in the driving coil 533*c* and the driving magnet 532*c*. In this case, the movable plate 553 is displaced so as to rotate clockwise when viewed from above. For example, a Lorentz force in the Y2 direction is generated in the driving coil 533*b* and the driving magnet 532*b*, and a current flows so that a Lorentz force in the Y1 direction is generated in the driving coil 533*c* and the driving magnet 532*c*. In this case, the movable plate 553 is displaced so as to rotate counterclockwise when viewed from above.

In this manner, the image generation unit 50 can relatively move the movable unit 55 with respect to the stationary unit 51, and can freely shift the MAD 551 in the X direction and the Y direction and move in the rotation direction. Accordingly, for example, the image generation unit 50 can move the DMD 551 in the oblique 45 degree direction by a half pixel pitch of a certain frequency and output an image matching the direction, thereby achieving high resolution. Further, since the DMD 551 can be freely shifted in the X direction and in the Y direction and moved in the rotation direction, the projection image can be easily shifted in the horizontal direction and the vertical direction and easily adjusted in the rotation direction.

The magnitude and direction of the current flowing through each driving coil 533 are controlled by the drive controller 12 of the system control unit 10. The drive controller 12 controls, for example, the movement (rotation) direction, the movement amount, and the rotation angle of the movable plate 553 according to the magnitude and direction of the current flowing to each driving coil 533.

Note that the configuration of the above-described driver is not limited to the configuration exemplified in the present embodiment. The number and position of the driving magnets 532 and the driving coils 533 as the driver may be different from the number and position of the present embodiment as long as the movable unit 55 can be moved to any given position. For example, the position detection magnets may be disposed on the top plate 511 and the Hall elements 558 may be disposed on the movable plate 553.

Position Detector

In the present embodiment, the image generation unit 50 includes the position detection magnets on the lower surface (the surface on the heat sink 554 side) of the intermediate plate 512 and the Hall elements 558 disposed on the upper surface of the movable plate 553. The position detection magnets and the Hall elements 558 constitute the position detector to detect the position of the DMD 551.

As illustrated in FIG. 14, the Hall elements 558 are disposed on the upper surface (the surface on the top plate 511 side) of the position detecting FPC 564 on the upper surface of the movable plate 553 and are disposed at positions opposed to the position detection magnets on the lower surface of the intermediate plate 512

The Hall element 558 is an example of magnetic sensor and transmits a signal according to a change in magnetic flux density from the corresponding position detection magnet to the drive controller 12 of the system control unit 10. The drive controller 12 detects the position of the DMD 551 based on signals transmitted from the Hall elements 558.

In the present embodiment, the top plate 511 and the base plate 513 formed of a magnetic material function as a yoke plate and constitute a magnetic circuit including the position detection magnets. A magnetic flux generated in the driver including the driving magnets 532 and the driving coils 533 disposed between the sub plate 514 and the heat sink 554 concentrates on the sub plate 514 functioning as the yoke plate, thus suppressing leakage of the magnetic flux to the position detector.

Accordingly, the magnetic flux generated in the driver concentrates on the sub plate 514 and the heat sink 554, thus suppressing leakage of the magnetic flux to the outside from between the sub plate 514 and the heat sink 554.

Thus, in the Hall elements 558 disposed on the upper surface of the movable plate 553, the influence of magnetic fields formed in the driver including the driving magnets 532 and the driving coils 533 is reduced. Therefore, the Hall element 558 can output a signal corresponding to a change in magnetic flux density of the corresponding position detecting magnet without being affected by the magnetic fields generated in the driver. Thus, the drive controller 12 can grasp the position of the DMD 551 with high accuracy.

The drive controller 12 (see FIG. 2) can accurately detect the position of the DMD 551 based on the outputs of the Hall elements 558 whose influence from the driver is reduced. Accordingly, the drive controller 12 can control the magnitude and direction of the current flowing through each of the driving coils 533 according to the detected position of the DMD 551, thus allowing the position of the DMD 551 to be controlled with high accuracy.

Note that the configuration of the above-described position detector is not limited to the configuration exemplified in the present embodiment. The number and positions of the position detection magnets and the Hall elements 558 as the position detector may be different from the number and positions of the present embodiment as long as the position of the DMD 551 can be detected.

For example, the position detection magnets may be disposed on the lower surface of the top plate 511 and the Hall elements 558 may be disposed on the upper surface of the movable plate 553. Alternatively, the position detecting magnets may be disposed on the upper surface of any one of the top plate 511, the DMD substrate 552, and the movable plate 553. The Hall elements 558 may be disposed on the lower surface of any one of the above-described plates. Further, the position detecting magnets may be disposed on the top plate 511, the DMD substrate 552, or the movable plate 553, and the Hall elements 558 may be disposed on the upper surface of the base plate 513 or the sub plate 514.

Further, the sub plate 514 may be partially formed of a magnetic material as long as the leakage of the magnetic flux from the driver to the position detector can be reduced. For example, the sub plate 514 may be formed by stacking a plurality of members including a flat-plate-shaped member or a sheet-shaped member formed of a magnetic material. If at least a part of the sub plate 514 is made of a magnetic material so as to function as a yoke plate and leakage of magnetic flux from the driver to the position detector can be prevented, the base plate 513 may be formed of a nonmagnetic material.

The top plate 511, the DMD substrate 552, or the movable plate 553 is preferably made of a conductive material, such as stainless steel, aluminum, or magnesium alloy. Thus, for example, electric noise generated in the DMD 551 and the DMD substrate 552 is released to, e.g., the housing of the illumination optical unit 40 through the top plate 511 and the DMD substrate 552. Such a configuration can reduce noise leakage to the outside.

Image Projection

As described above, in the projector 1 according to the present embodiment, the DMD 551 to generate a projection image is disposed in the movable unit 55, and the position of the DMD 551 is controlled by the drive controller 12 of the system control unit 10.

The drive controller 12 controls the position of the movable unit 55 so as to move at high speed between a plurality of positions separated by a distance less than the arrangement interval of the plurality of micromirrors of the DMD 551, for example, at a predetermined cycle corresponding to a frame rate during projection of an image. At this time, the image controller 11 transmits the image signal to the DMD 551 so as to generate the projection image having been shifted according to each position.

For example, the drive controller 12 reciprocates the DMD 551 at the predetermined cycle between the positions separated by the distance less than the arrangement interval of the micromirrors of the DMD 551 in the X1-X2 direction and the Y1-Y2 direction. At this time, the image controller 11 controls the DMD 551 so as to generate projection images shifted according to the respective positions, thus allowing the resolution of the projection images to be made approximately twice as high as the resolution of the DMD 551. Further, by increasing the moving position of the DMD 551, the resolution of the projection image can be made twice or more than the resolution of the DMD 551.

Accordingly, the drive controller 12 shifts the DMD 551 together with the movable unit 55, and the image controller 11 generates a projection image corresponding to the position of the DMD 551, thus allowing projection of an image whose resolution has been made equal to or higher than the resolution of the DMD 551.

In the projector 1 according to the present embodiment, the drive controller 12 controls the DMD 551 to rotate together with the movable unit 55, thus allowing the projection image to be rotated without being reduced. For example, in a projector in which an image generator, such as the DMD 551, is fixed, a projection image cannot be rotated while maintaining the aspect ratio of the projection image, unless the projection image is reduced. By contrast, in the projector 1 according to the present embodiment, since the DMD 551 can be rotated, the inclination or the like can be adjusted by rotating the projection image without reducing the projection image.

Dustproof Unit

Figure 15:
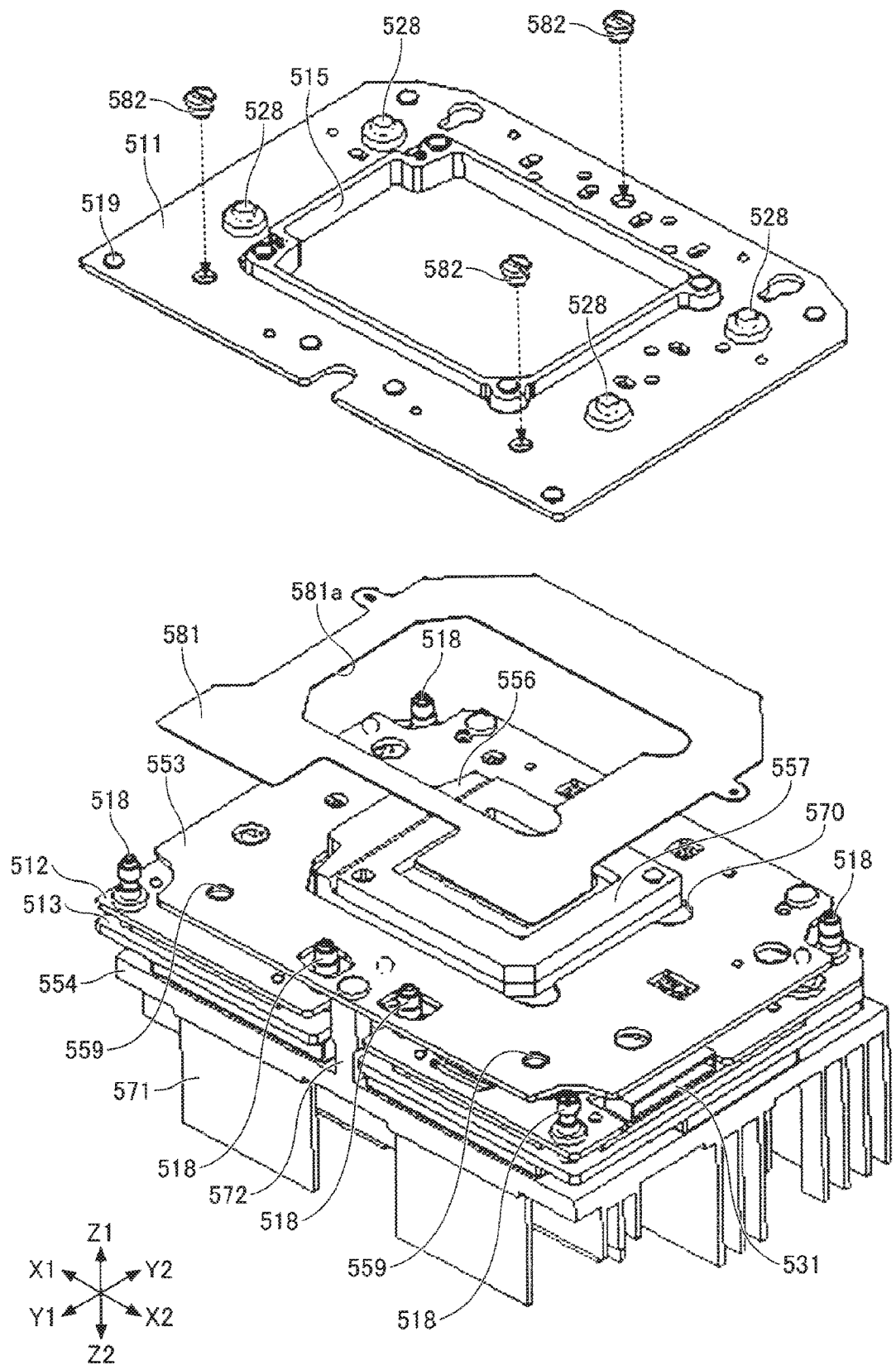
FIG. 15 is an illustration of a state in which a top plate, the movable plate, and a dustproof member are disassembled.
Figure 16:
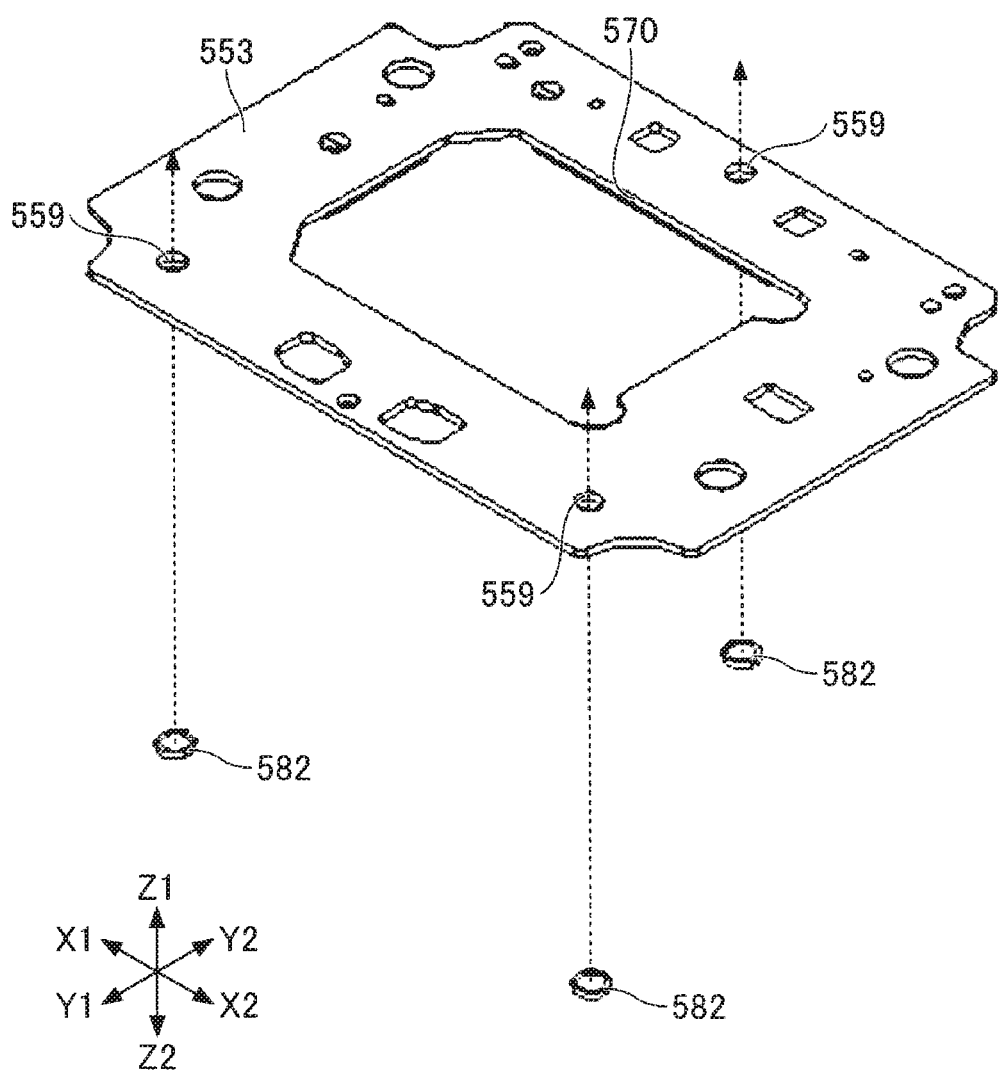
FIG. 16 is an illustration of a state in which holding members are inserted into the movable plate.
Figure 17:
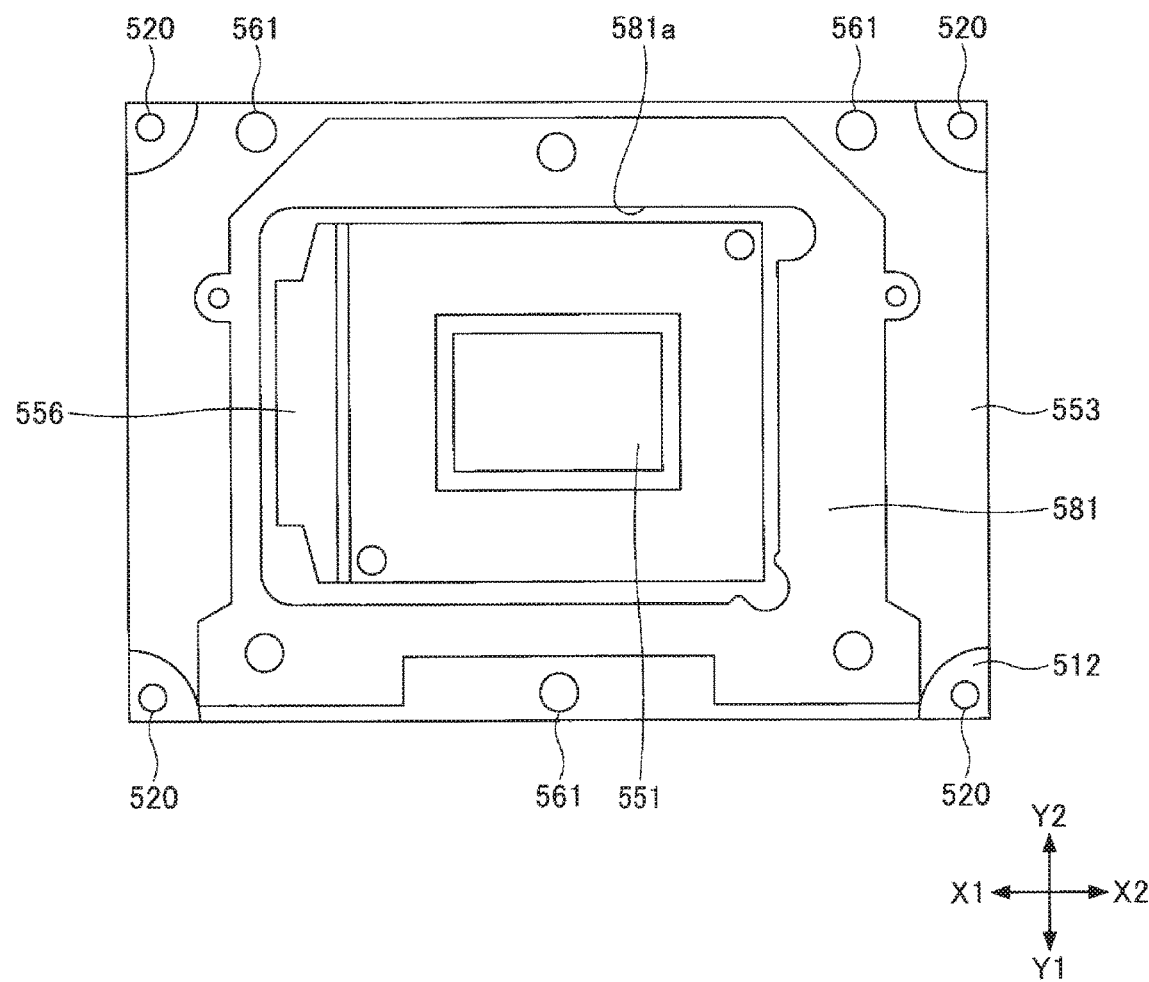
FIG. 17 is a plan view of a state in which the dustproof member is mounted on the movable plate.

As illustrated in FIGS. 7 and 8, the dustproof unit 58 includes a dustproof member 581 and a pair of holding members 582 opposed to each other as a holder. FIG. 15 is an illustration of a state in which the top plate 511, the movable plate 553, and the dustproof member 581 are disassembled. FIG. 16 is an illustration of a state in which the holding members 582 are inserted into the movable plate 553. FIG. 17 is an illustration of a state in which the dustproof member 581 is mounted on the movable plate 553. The configuration of the dustproof unit 58 is described with reference to FIGS. 15 to 17. In FIG. 15, illustration of the position detection FPC and the Hall elements 558 disposed on the upper surface (the surface of the top plate 511) of the movable plate 553 is omitted.

As illustrated in FIGS. 15 to 17, the dustproof member 581 is a thin, plate-shaped member disposed between the top plate 511 and the movable plate 553. The dustproof member 581 is formed so as to surround the periphery of the DMD 551, and a center hole 581a is disposed in a portion corresponding to the DMD 551. The dustproof member 581 disposed in the gap between the top plate 511 and the movable plate 553 reduces the gap between the top plate 511 and the movable plate 553. Such a configuration can reduce dust entering through the gap between the top plate 511 and the movable plate 553 and reduce adhesion of dust to the DMD 551.

Since the movable unit 55 moves, a gap is disposed between the movable unit 55 and the stationary unit 51. On the other hand, since the movable unit 55 is provided with the DMD 551, dust or the like might enter from, for example, a gap between the illumination optical unit 40 and the image generation unit 50 and adhere to the DMD 551 to deteriorate the quality of the projection image. In the present embodiment, the dustproof member 581 can prevent dust and the like from adhering to the DMD 551, thus preventing a reduction in quality of the projection image.

Further, the outer periphery of the dustproof member 581 is configured to have a size at which the dustproof member 581 does not contact the support balls 522 (see, e.g., FIGS. 7 and 8) arranged between the top plate 511 and the movable plate 553. Such a configuration allows the dustproof member 581 to stably move between the top plate 511 and the movable plate 553.

The thickness of the dustproof member 581 is not limited to any particular value, but it is preferably, for example, in a range from 0.05 mm to 0.2 mm. When the thickness of the dustproof member 581 is 0.05 mm or more, the dustproof member 581 can be stably manufactured with high accuracy. If the thickness of the dustproof member 581 is 0.2 mm or less, it is possible to effectively prevent dust and the like from entering into the space between the top plate 511 and the movable plate 553.

The top plate 511 includes three pinching holes 511a. The movable plate 553 includes three pinching holes 553a. The pinching holes 511a and the pinching holes 553a are disposed at positions corresponding to the top plate 511 and the movable plate 553, respectively.

Figure 18:
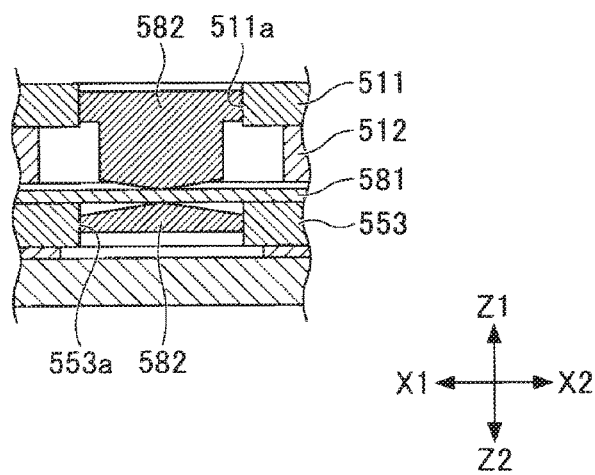
FIG. 18 is a partially enlarged view of a region indicated by T of FIG. 10.

FIG. 18 is a partially enlarged view of a region indicated by T in FIG. 10. As illustrated in FIG. 18, in the present embodiment, three pairs of holding members 582 are disposed in the pinching holes 511a and 553a of the top plate 511 and the movable plate 553. By inserting the three pairs of holding members 582 into the pinching holes 511a and 553a, the dustproof member 581 is interposed and held between the top plate 511 and the movable plate 553. Accordingly, the dustproof member 581 can move the space between the top plate 511 and the movable plate 553 in a planar direction of the dustproof member 581 via the pair of holding members 582.

Further, the three pairs of holding members 582 support the dustproof member 581 at three points by the top plate 511 and the movable plate 553. Such a configuration can reduce the sliding resistance when the movable plate 553 moves in the planar direction of the movable plate 553, thus allowing the movable plate 553 to move stably in the planar direction. Thus, the dustproof effect can be exerted without affecting the driving performance of the movable unit 55.

The three pinching holes 511a and the three pinching holes 553a are disposed in the top plate 511 and the movable plate 553, respectively. However, the number of the pinching holes 511a and the number of the pinching holes 553a are not limited to three, and may be three or more. Three or more pairs of holding members 582 are may be disposed. Three pairs of holding members 582 are preferably disposed in that the dustproof member 581 is stably supported by the pairs of holding members 582 between the top plate 511 and the movable plate 553.

Figure 19:
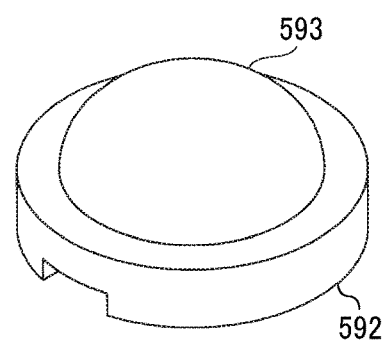
FIG. 19 is a perspective view of an example of the holding member.

FIG. 19 is a perspective view of an example of the configuration of the holding member 582. As illustrated in FIG. 19, the pair of holding members 582 includes a base portion 592 and a spherical portion 593. The spherical portion 593 contacts the dustproof member 581 in a direction in which the holding members 582 face each other. Since a leading end of the spherical portion 593 is spherical, the dustproof member 581 can be pinched by point-contacting the pair of holding members 582 so as not to contact the top plate 511 and the movable plate 553. Accordingly, the dustproof member 581 can be stably supported in slidable manner between the top plate 511 and the movable plate 553 via the pair of holding members 582. Such a configuration can reduced the sliding resistance when the movable plate 553 moves in the planar direction of the movable plate 553, thus allowing stable movement without hampering the movement of the movable plate 553.

Further, the dustproof member 581 is movably supported between the top plate 511 and the movable plate 553 via the pairs of holding members 582. Meanwhile, the movable plate 553 is movably supported between the top plate 511 and the base plate 513 via the pairs of support balls 522. Such a configuration allows the dustproof member 581 to be moved independently of the movement of the movable plate 553. For example, the dustproof member 581 can be moved completely or partially following the movement of the movable plate 553 or stopped without moving following the movement of the movable plate 553.

Further, similarly to the top plate 511, the DMD substrate 552, and the movable plate 553, the dustproof member 581 or the holding member 582 is preferably made of a conductive material, such as stainless steel, copper, aluminum, magnesium alloy, or the like. Thus, for example, electrical noise generated in the DMD 551 and the DMD substrate 552 can be released to, for example, the housing of the illumination optical unit 40 through the top plate 511, the DMD substrate 552, the movable plate 553, and the holding members 582. Such a configuration can reduce noise leakage to the outside.

The three pairs of holding members 582 inserted into the pinching holes 511a and 553a are preferably disposed at the positions opposed to each other via the dustproof member 581. Note that the term "positions opposed to each other" includes the same position in plan view at which the pair of holding members 582 contact the dustproof member 581 or a range in which that the holding member 582 inserted into the pinching hole 511a is slightly shifted from the holding member 582 inserted into the pinching hole 553a.

For example, when the movable unit 55 is at a reference position, the holding members 582 inserted into the pinching holes 511a and 553a, respectively, are adjusted so as to be at the same position of the dustproof member 581. Note that the reference position used herein is, for example, a stop position when the operation of the image generation unit 50 is stopped and the movable unit 55 is not performing the shift operation.

Such a configuration facilitates adjustment of the amount of projection of the holding member 582 beyond the pinching holes 511a and 553a during assembly of the image generation unit 50. Accordingly, when the dustproof member 581 is pinched by the pair of holding members 582, the dustproof member 581 can be stably maintained in a flat state without being deflected.

As described above, the dustproof unit 58 is disposed so as to narrow the gap between the top plate 511 and the movable plate 553 while allowing the dustproof member 581 to slide between the top plate 511 and the movable plate 553. Such a configuration can reduce the dust entering through the gap between the top plate 511 and the movable plate 553 and adhering to the DMD 551 without hampering the driving performance of the movable unit 55. Accordingly, since the influence on the movement of the DMD 551 can be reduced, it is possible to prevent side effects of dust on the projection image while increasing the resolution of the projection image.

In the image generation unit 50 according to the present embodiment, the dustproof member 581 is disposed between the top plate 511 and the movable plate 553. Such a configuration can simply and easily reduce adhesion dust to the DMD 551 without hampering operation of the movable unit 55. For example, a method of providing the movable member may be considered in Which a protective glass is disposed around the DMD 551 to prevent adhesion of dust to the DMD 551 and an air flow is formed around the protective glass to prevent adhesion of dust to the protective glass. In such a case, an air supply path to supply air and actuators to operate the protective glass and the movable member need be newly provided in the device. Accordingly, the configuration of the image generation unit 50 might be complicated, thus increasing the cost. By contrast, in the image generation unit 50 according to the present embodiment, adhesion of dust to the DMD 551 can be easily reduced without newly providing such components.

In the present embodiment, the dustproof member 581 is formed of a plate-shaped member. However, the configuration of the dustproof member 581 is not limited to the plate-shaped member but may ne any other configuration as long as the dustproof member 581 is configured so as to surround the DMD 551 between the top plate 511 and the movable plate 553.

In the present embodiment, the pair of holding members 582 are disposed between the top plate 511 and the movable plate 553 but may be disposed between the top plate 511 and the DMD substrate 552. Even with such a configuration, the dustproof member 581 can slide. The gap between the top plate 511 and the DMD substrate 552 can be narrowed and the entry of dust can be reduced without hampering the operation of the movable unit 55.

In the present embodiment, the case in which each of the number of the pinching holes 511a in the top plate 511 and the number of the pinching holes 553a in the movable plate 553 is three has been described, but the number is not limited to three. For example, each of the number of the pinching holes 511a and the number of the pinching holes 553a may be three or more as long as the dustproof member 581 can be interposed between the top plate 511 and the movable plate 553.

Furthermore, in the present embodiment, the case in which the pair of holding members 582 are used as the holder has been described, but the configuration of the holder is not limited to the pair of holding members 582. For example, the holder may be a pair of convex portions facing the top plate 511 and the movable plate 553, respectively.

Further, in the present embodiment, the case where the pair of holding members 582 have the spherical portion 593 to contact the dustproof member 581 has been described. However, the configuration of the pair of holding members 582 is not limited to the configuration of the present embodiment. For example, the pair of holding members may be, for example, balls to contact the dustproof member 581 while being rotatably held by the pinching holes 511a and 553a.

Further, in the present embodiment, the pair of holding members 582 are all the same size, but the configuration of the pair of holding members is not limited to the configuration of the present embodiment. The pair of holding members 582 may be any other configuration as long as it is possible to narrow the gap between the top plate 511 and the movable plate 553 while movably holding the dustproof member 581 between the top plate 511 and the movable plate 553. For example, the shape and size of the pair of holding members 582 may be different from each other. For example, the outer shape, the shape of the center hole, and the thickness of the pair of holding members 582 may be different from each other. The holding member. 582 inserted into the pinching hole 511a may be larger than the holding member 582 inserted into the pinching hole 553a. Alternatively, the holding member 582 inserted into the pinching hole 511a may be smaller than the holding member 582 inserted into the pinching hole 553a.

As described above, in the projector 1 according to the present embodiment, the DMD 551 is movably provided. The DMD 551 can be shift to increase the resolution of the projection image. Further, the dustproof unit 58 can reduce the dust entering from the gap between the top plate 511 and the DMD substrate 552 and adhering to the DMD 551 without disturbing the operation performance of the movable unit 55. Accordingly, the projector 1 according to the present embodiment can suppress a reduction in image quality, such as distortion of an image due to adhesion of dust to the DMD 551.

Although the image generation device and the image projection apparatus according to some embodiments have been described above, embodiments of the present invention are not limited to the above-described embodiments, and various modifications and improvements are possible within the scope of the present invention.

Numerous additional modifications and variations are possible in light of the above teachings. it is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image generation device comprising:
   an image generator to receive light and generate an image;
   a stationary unit including:
      a first stationary plate; and
      a second stationary plate opposed to the first stationary plate;
   a movable unit including a movable plate movably supported between the first stationary plate and the second stationary plate, the image generator mounted on the movable plate; and
   a dustproof unit including a dustproof member between the first stationary plate and the movable plate, the dustproof member surrounding the image generator,
   wherein the movable unit further includes another movable plate connected to the movable plate on a side of the movable plate at which the first stationary plate is disposed,
   wherein the dustproof unit includes a holder to hold the dustproof member between the first stationary plate and the another movable plate,
   wherein the holder includes three or more pairs of holding members opposed to the first stationary plate and the another movable plate via the dustproof member, and
   wherein the dustproof member is supported between the first stationary plate and the another movable plate to be movable in a planar direction of the dustproof member.

2. The image generation device according to claim 1, wherein the three or more pairs of holding members include a spherical portion to contact the dustproof member.

3. The image generation device according to claim 1, wherein each of the first stationary plate and the another movable plate has three or more pinching holes, and
   wherein the three or more pinching holes of the first stationary plate are opposed to the three or more pinching holes of the another movable plate, respectively, via the dustproof member.

4. The image generation device according to claim 1, wherein at least one of the first stationary plate, the movable plate, the another movable plate, and the three or more pairs of holding members is made of a conductive material.

5. An image projection apparatus comprising:
   a light source;
   the image generation device according to claim 1 to receive light from the light source and generate an image;
   an illumination optical unit to guide the light from the light source to the image generation device; and
   a projection optical unit to project the image generated by the image generation device.

6. An image generation device comprising:
   an image generator to receive light and generate an image;
   a stationary unit including:
      a first stationary plate; and
      a second stationary plate opposed to the first stationary plate;
   a movable unit including a movable plate movably supported between the first stationary plate and the second stationary plate, the image generator mounted on the movable plate;
   a dustproof unit including a dustproof member between the first stationary plate and the movable plate, the dustproof member surrounding the image generator;
   a driving magnet;
   a driving coil opposed to the driving magnet between the movable plate and the second stationary plate;
   a driver to relatively move the movable unit with respect to the stationary unit;
   a drive controller to control the driver; and
   an image controller to generate an image signal according to a position of the movable unit and transmit the image signal to the image generator,
   wherein the image generator includes a digital micromirror device in which a plurality of micromirrors to modulate, according to the image signal, light emitted from a light source are arranged, and
   wherein the drive controller controls the driver to move the movable unit at a predetermined cycle by a distance less than an arrangement interval of the plurality of micromirrors.

* * * * *